US011346716B2

(12) United States Patent
Baik

(10) Patent No.: US 11,346,716 B2
(45) Date of Patent: May 31, 2022

(54) OPTICAL FILTER, SPECTROMETER INCLUDING THE OPTICAL FILTER, AND ELECTRONIC APPARATUS INCLUDING THE OPTICAL FILTER

(71) Applicant: SAMSUNG ELECTRONICS CO., LTD., Suwon-si (KR)

(72) Inventor: Chanwook Baik, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/091,793

(22) Filed: Nov. 6, 2020

(65) Prior Publication Data
US 2021/0140818 A1 May 13, 2021

(30) Foreign Application Priority Data
Nov. 7, 2019 (KR) .......................... 10-2019-0141900

(51) Int. Cl.
*G01J 3/26* (2006.01)
*G01J 3/02* (2006.01)
*G01J 3/45* (2006.01)
*G02B 5/28* (2006.01)
*G02B 5/20* (2006.01)

(52) U.S. Cl.
CPC ............... *G01J 3/26* (2013.01); *G01J 3/021* (2013.01); *G01J 3/45* (2013.01); *G02B 5/284* (2013.01); *G02B 5/207* (2013.01); *G02B 2207/101* (2013.01)

(58) Field of Classification Search
CPC ..... G01J 3/26; G01J 3/021; G01J 3/45; G02B 5/284; G02B 5/207; G02B 2207/101
USPC ............................................ 356/326
See application file for complete search history.

(56) References Cited

U.S. PATENT DOCUMENTS

| 8,702,321 B2 | 4/2014 | Marple et al. |
| 9,939,587 B2 | 4/2018 | Han et al. |
| 2003/0059855 A1* | 3/2003 | Cunningham ............ G01J 3/42 435/7.9 |
| 2006/0181705 A1* | 8/2006 | Cunningham ... G01N 33/54373 356/326 |

(Continued)

FOREIGN PATENT DOCUMENTS

| CN | 108731806 A | 11/2018 |
| DE | 10 2006 039 072 A1 | 2/2008 |

(Continued)

OTHER PUBLICATIONS

Communication dated Apr. 1, 2021, issued by the European Patent Office in European Application No. 20205813.7.
Steffen Kurth et al., "Fabry-Perot tunable infrared filter based on structured reflectors", Proceedings of the SPIE, 2012, vol. 8428, pp. 842810-1-842810-11 (11 pages total).
Nishant Shankhwar et al., "Dielectric ring based metamaterial perfect reflector", Proceedings of SPIE, Sep. 5, 2019, vol. 11080, pp. 110802W-1-110802W-4 (4 pages total).

(Continued)

*Primary Examiner* — Tarifur R Chowdhury
*Assistant Examiner* — Omar H Nixon
(74) *Attorney, Agent, or Firm* — Sughrue Mion, PLLC

(57) ABSTRACT

An optical filter, a spectrometer including the optical filter, and an electronic apparatus including the optical filter are disclosed. The optical filter includes a first reflector including a plurality of first structures that are periodically two-dimensionally arranged, each of the first structures having a ring shape, and a second reflector spaced apart from the first reflector and including a plurality of second structures that are periodically two-dimensionally arranged.

23 Claims, 34 Drawing Sheets

(56) References Cited

U.S. PATENT DOCUMENTS

| | | |
|---|---|---|
| 2008/0278722 A1* | 11/2008 | Cunningham ....... G01N 33/582 |
| | | 356/317 |
| 2012/0194911 A1 | 8/2012 | Li et al. |
| 2012/0236382 A1 | 9/2012 | Puegner et al. |
| 2015/0285677 A1 | 10/2015 | Lee et al. |
| 2016/0274282 A1 | 9/2016 | Shen et al. |
| 2018/0274977 A1 | 9/2018 | Baik et al. |
| 2019/0025120 A1 | 1/2019 | Lee et al. |

FOREIGN PATENT DOCUMENTS

| | | | |
|---|---|---|---|
| ER | 3 379 214 A1 | 9/2018 | |
| JP | 2013164429 A * | 8/2013 | ............... G02B 5/20 |
| KR | 10-2018-0108212 A | 10/2018 | |

OTHER PUBLICATIONS

Chuan Wang et al., "Broadband filter using multi-layer sub-wavelength high-contrast grating structure", Frontiers of Optoelectronics, Higher Education Press, Aug. 2014, vol. 7, No. 3, pp. 393-398 (6 pages total).

Horie, Yu et al., "High resolution on-chip optical filter array based on double subwavelength grating reflectors", Optical Society of America, Optics Express, p. 29848-29854, vol. 23, No. 23, DOI: 10.1364/OE.23.029848; Nov. 16, 2015; 7 pages.

Xia, Zhixuan et al., "High resolution on-chip spectroscopy based on miniaturized microdonut resonators", Optical Society of America, Optics Express, p. 12356-12364, vol. 19, No. 13, Jun. 20, 2011, 9 pages.

Kyotoku, Bernardo et al., "Sub-nm resolution cavity enhanced micro-spectrometer", Optical Society of America, Optics Express, p. 102-107, vol. 18, No. 1, Jan. 5, 2010, 6 pages.

* cited by examiner

OPTICAL FILTER, SPECTROMETER INCLUDING THE OPTICAL FILTER, AND ELECTRONIC APPARATUS INCLUDING THE OPTICAL FILTER

CROSS-REFERENCE TO RELATED APPLICATION

This application claims priority to Korean Patent Application No. 10-2019-0141900, filed on Nov. 7, 2019, in the Korean Intellectual Property Office, the disclosure of which is incorporated by reference herein in its entirety.

BACKGROUND

1. Field

Example embodiments consistent with the present disclosure relate to an optical filter, a spectrometer including the optical filter, and an electronic apparatus including the optical filter.

2. Description of Related Art

Optical elements that change the transmission, reflection, polarization, phase, intensity, or path properties of incident light are used in various optical fields. Recently, attempts have been made to implement optical elements that exhibit various optical characteristics and that are miniaturized by using sub-wavelength structures.

The sub-wavelength structures may be used for spectrometers. In general, a resonant structure having a specific resonant wavelength may be implemented by arranging two reflectors spaced apart by a certain distance from each other. Such a reflector employed for this purpose includes a distributed Bragg reflector in which material layers having different refractive indexes are repeatedly stacked to a thickness of ¼ wavelength of incident light. In this case, as an increase in the number of stacked layers is necessary to increase reflectivity and the resonant wavelength is set by adjusting the distance between the reflectors, it may be difficult to set a desired resonant wavelength in an ultra-compact size.

SUMMARY

Example embodiments provide an optical filter, a spectrometer including the optical filter, and an electronic apparatus including the optical filter.

Additional aspects will be set forth in part in the description which follows and, in part, will be apparent from the description, or may be learned by practice of embodiments of the disclosure.

According to an aspect of an example embodiment, an optical filter includes: a first reflector including a plurality of first structures that are periodically two-dimensionally arranged, each first structure of the plurality of first structures having a ring shape; and a second reflector spaced apart from the first reflector, the second reflector including a plurality of second structures that are periodically two-dimensionally arranged.

Each second structure of the plurality of second structures may have the ring shape or a disc shape.

A first size and a first pitch of the plurality of first structures may be less than a wavelength of incident light that is incident on the optical filter, and a second size and a second pitch of the plurality of second structures may be less than the wavelength of the incident light.

A transmission wavelength of the incident light may be determined based on at least one of respective refractive indexes of the plurality of first structures and the plurality of second structures, the first size of the plurality of first structures, the second size of the plurality of second structures, the first pitch of the plurality of first structures, the second pitch of the plurality of second structures, and an interval between the first reflector and the second reflector.

The first sizes of the plurality of first structures may include at least one of a first inner radius, a first outer radius, a first ratio between the first inner radius and the first outer radius, and a first height, and the second sizes of the plurality of second structures may include at least one of a second inner radius, a second outer radius, a second ratio between the second inner radius and the second outer radius, and a second height.

The transmission wavelength of the incident light may be determined based on at least one of the first inner radius, the first outer radius, the first ratio between the first inner radius and the first outer radius, the second inner radius, the second outer radius, and the second ratio between the second inner radius and the second outer radius.

Each second structure of the plurality of second structures may entirely overlap a corresponding first structure of the plurality of first structures in a direction perpendicular to a plane of the optical filter.

The optical filter may further include a material layer surrounding the plurality of first structures and the plurality of second structures.

The plurality of first structures and the plurality of second structures may each include a dielectric material having a higher refractive index and a lower absorption coefficient than a refractive index and an absorption coefficient, respectively, of the material layer.

The plurality of first structures and the plurality of second structures may each include at least one from among crystalline silicon, amorphous silicon, titanium oxide, silicon nitride, titanium nitride, transparent conductive oxide, a group III-V semiconductor compound, and metal oxide.

The optical filter may further include a third reflector spaced apart from the second reflector, the third reflector including a plurality of third structures that are periodically two-dimensionally arranged.

Each third structure of the plurality of third structures may have the ring shape or the disc shape.

In accordance with an aspect of an example embodiment, an optical filter includes: a plurality of partial filters having different center wavelengths, wherein each partial filter from among the plurality of partial filters includes a first reflector including a plurality of first structures that are periodically two-dimensionally arranged, each first structure of the plurality of first structures having a ring shape; and a second reflector spaced apart from the first reflector, the second reflector including a plurality of second structures that are periodically two-dimensionally arranged.

Each second structure of the plurality of second structures may have the ring shape or a disc shape.

A transmission wavelength of incident light is determined based on at least one of respective refractive indexes of the plurality of first structures and the plurality of second structures, a first size of the plurality of first structures, a second size of the plurality of second structures, a first pitch of the plurality of first structures, a second pitch of the plurality of second structures, and an interval between the first reflector and the second reflector.

The optical filter may further include a material layer surrounding the plurality of first structures and the plurality of second structures.

In accordance with an aspect of an example embodiment, a spectrometer includes: an optical filter including at least one partial filter; and a light detecting device configured to receive light transmitted through the optical filter, wherein each partial filter from among the at least one partial filter includes a first reflector including a plurality of first structures that are periodically two-dimensionally arranged, each first structure from among the plurality of first structures having a ring shape and a second reflector spaced apart from the first reflector, the second reflector including a plurality of second structures that are periodically two-dimensionally arranged.

Each second structure from among the plurality of second structures may have the ring shape or a disc shape.

The light detecting device may include an image sensor or a photodiode.

In accordance with an aspect of the disclosure, an electronic apparatus includes: a light source configured to radiate light toward an object; a spectrometer disposed on a light path of light reflected from the object; and a processor configured to analyze at least one from among physical properties, a shape, a location, and a motion of the object, by using light detected by the spectrometer, wherein the spectrometer includes an optical filter including at least one partial filter and a light detecting device configured to receive light transmitted through the optical filter; a first reflector including a plurality of first structures that are periodically two-dimensionally arranged, each first structure from among the plurality of first structures having a ring shape; and a second reflector spaced apart from the first reflector, the second reflector including a plurality of second structures that are periodically two-dimensionally arranged.

In accordance with an aspect of the disclosure, an optical filter includes: a first layer of first nanostructures, the first nanostructures having a ring shape or a disc shape; and a second layer of second nanostructures, the second nanostructures having the ring shape or the disc shape, wherein a dimension from among a plurality of dimensions of the first nanostructures and the second nanostructures is less than a wavelength of light incident upon the optical filter.

The first nanostructures may have the ring shape.

The plurality of dimensions may include an inner radius of the first nanostructures and the second nanostructures, an outer radius of the first nanostructures and the second nanostructures, a ratio between the inner radius and the outer radius, a height of the first nanostructures and the second nanostructures, and a distance between the first layer and the second layer.

The first nanostructures may be periodically arranged at a first interval in the first layer and the second nanostructures may be periodically arranged at a second interval in the second layer.

The plurality of dimensions may include an inner radius of the first nanostructures and the second nanostructures, an outer radius of the first nanostructures and the second nanostructures, a ratio between the inner radius and the outer radius, a height of the first nanostructures and the second nanostructures, a distance between the first layer and the second layer, the first interval, and the second interval.

A first dimension of the first nanostructures may be different from a corresponding second dimension of the second nanostructures.

A spectrometer may include a plurality of the optical filters in accordance with the above-noted aspect of the disclosure, wherein the plurality of the optical filters includes a first optical filter and a second optical filter, and wherein a first dimension from among the plurality of dimensions of the first optical filter is different from a corresponding second dimension of the second optical filter such that the first optical filter transmits light of a first wavelength and the second optical filter transmits light of a second wavelength different from the first wavelength.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
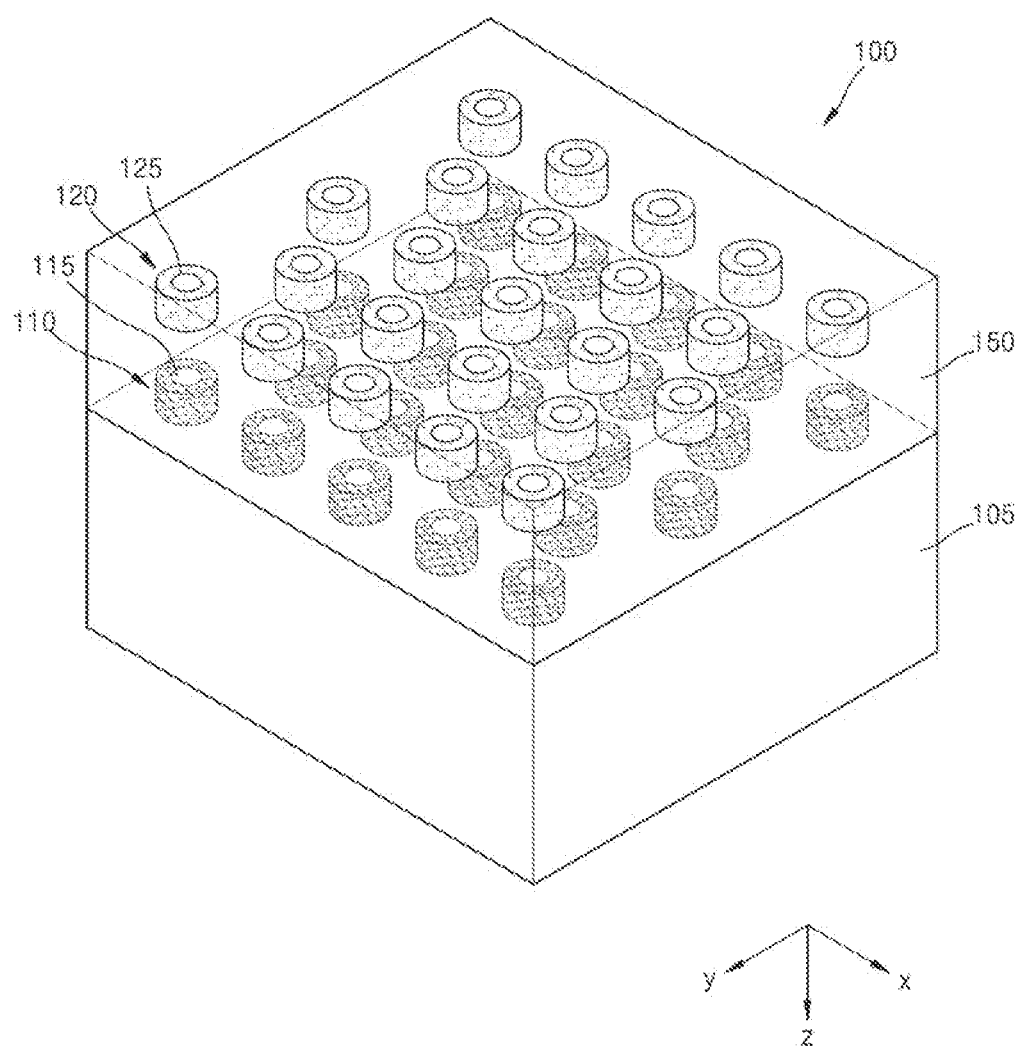
FIG. 1 is a perspective view of an optical filter according to an example embodiment.

Example embodiments will now be described with reference to the accompanying drawings, wherein like reference numerals refer to like elements throughout. In this regard, the example embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the description below, when a constituent element is disposed "above" or "on" another constituent element, the constituent element may be directly on the other constituent element or may be above the other constituent elements in a non-contact manner. Terms such as "first" and "second" are used herein merely to describe a variety of constituent elements, but the constituent elements are not limited by the terms. Such terms are used only for the purpose of distinguishing one constituent element from another constituent element.

The expression of singularity in the present specification includes the expression of plurality unless clearly specified otherwise in context. When a part may "include" a certain constituent element, unless specified otherwise, it may not be construed to exclude another constituent element but may be construed to further include other constituent elements.

Terms such as "~portion", "~unit", "~module", and "~block" stated in the specification may signify a unit to process at least one function or operation and the unit may be embodied by hardware, software, or a combination of hardware and software.

The connecting lines or connectors shown in the various figures presented are intended to represent functional relationships and/or physical or logical couplings between the various elements. It should be noted that many alternative or additional functional relationships, physical connections or logical connections may be present in a practical device.

Figure 2:
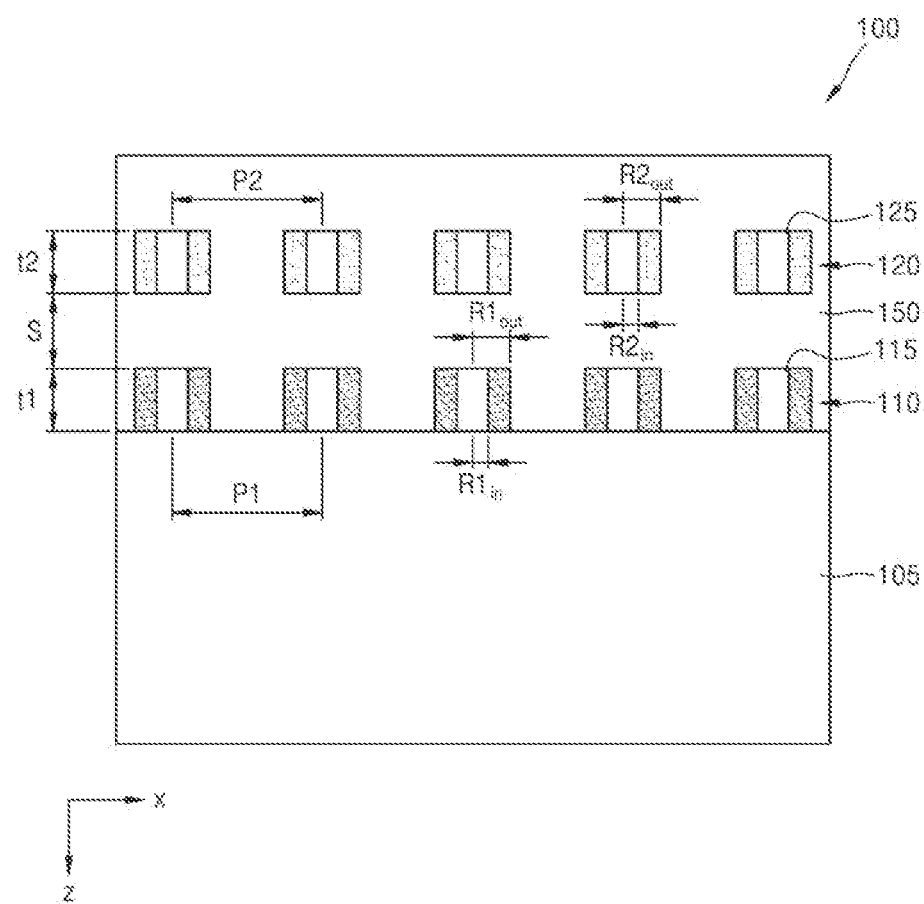
FIG. 2 is a cross-sectional view of the optical filter of FIG. 1.
Figure 3:
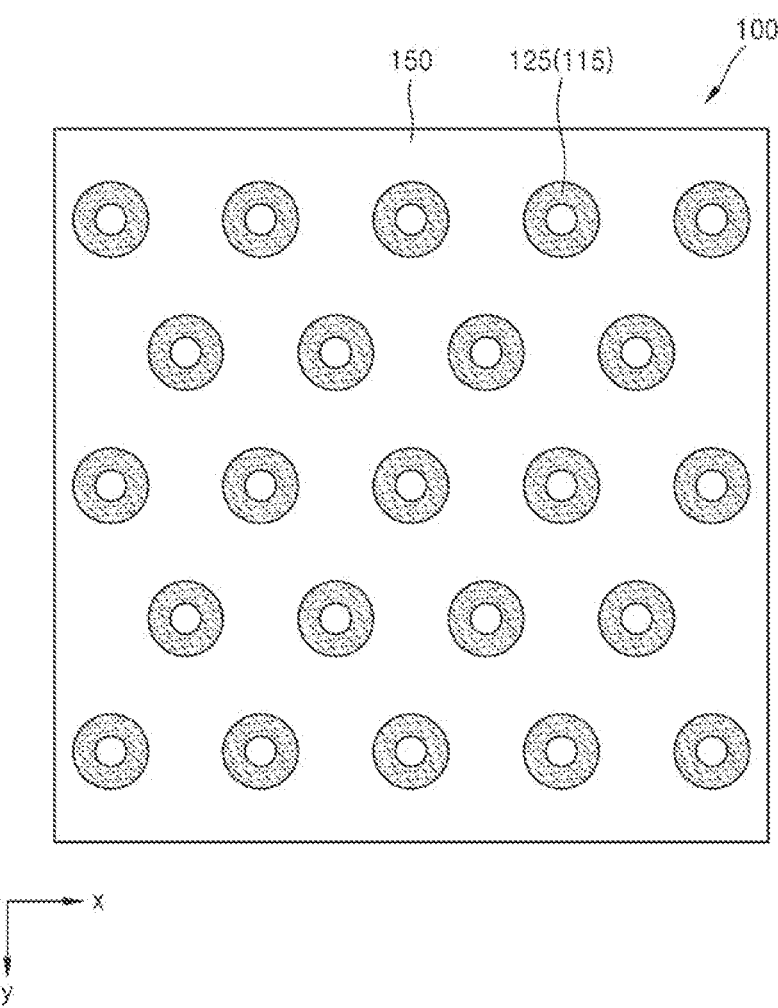
FIG. 3 is a plan view of the optical filter of FIG. 1.
Figure 4:
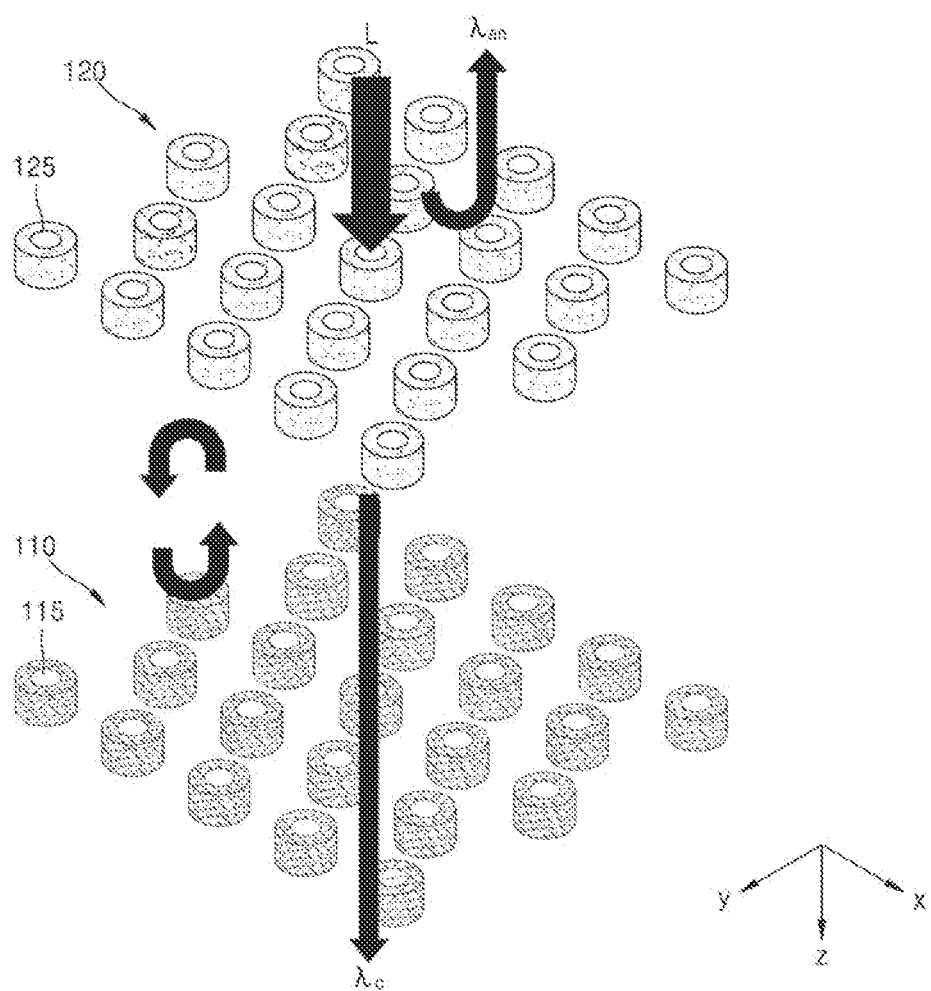
FIG. 4 is a conceptual diagram of a principle of transmitting light of a specific wavelength by first and second reflectors provided in the optical filter of FIG. 1.

FIG. 1 is a perspective view of an optical filter 100 according to an example embodiment. FIG. 2 is a cross-sectional view of the optical filter 100 of FIG. 1, and FIG. 3 is a plan view of the optical filter 100 of FIG. 1. FIG. 4 is a conceptual diagram of a principle of transmitting light of a specific wavelength by first and second reflectors provided in the optical filter 100 of FIG. 1.

Referring to FIGS. 1 to 4, the optical filter 100 may include first and second reflectors 110 and 120 (i.e., a first layer and a second layer) spaced apart from each other. The first and second reflectors 110 and 120 may be provided on a substrate 105. The substrate 105 may include, for example, a transparent material. The substrate 105 may include a material having a refractive index smaller than those of first and second structures 115 and 125, which are described later.

The first and second reflectors 110 and 120 may be arranged spaced apart from each other on or above the substrate 105 at a certain interval S as shown in FIG. 2. The first reflector 110 provided on an upper surface of the substrate 105 may include a plurality of first structures 115 (i.e., first nanostructures) arranged cyclically (i.e., periodically) in two dimensions. The second reflector 120 provided above the first reflector 110 may include a plurality of second structures 125 (i.e., second nanostructures) cyclically arranged in two dimensions.

The first and second structures 115 and 125 may include sub-wavelength structures. The sub-wavelength structures signify structures having sizes and pitches less than the wavelength of the incident light. Light incident on the optical filter 100 may include, for example, visible rays or infrared rays. However, the disclosure is not limited thereto.

The first and second structures 115 and 125 each may have a ring shape. In this state, the first structure 115 may have an outer radius $R1_{out}$, an inner radius $R1_{in}$, and a height t1, and the second structures 125 may have an outer radius $R2_{out}$, an inner radius $R2_{in}$, and a height t2 as shown in FIG. 2.

The first structures 115 may be cyclically arranged in a direction with a first pitch P1 (i.e., a first interval). The first structures 115 may be arranged in two dimensions, for example, in an equilateral triangular or regular hexagonal pattern, as illustrated in FIG. 3. In this case, three neighboring first structures 115 may be arranged at the respective vertexes of an equilateral triangle pattern. However, this is an example, and the first structures 115 may be arranged in other various patterns.

The second structures 125 may be cyclically arranged in a direction with a second pitch P2 (i.e., a second interval). The second structures 125, like the first structures 115, may be arranged in two dimensions, for example, in the form of an equilateral triangle or a regular hexagon. However, this is an example, and the second structures 125 may be arranged in other various patterns.

FIG. 1 illustrates an example in which the second structures 125 are symmetrically arranged with respect to the first structures 115. In other words, each second structure 125 may entirely overlap a corresponding first structure 115 in a direction perpendicular to a plane of the optical filter 100. In this case, the second structures 125 may have the same material, size, shape, and pitch as those of the first structures 115, respectively. In other words, the first and second structures 115 and 125 may be cyclically arranged in a direction, with the same pitch, in the form of an equilateral triangle or a regular hexagon. As illustrated in FIG. 3, when viewed from a plan view that is perpendicular to a z-axis direction in which the first and second reflectors 110 and 120 are spaced apart from each other, the first structures 115 and the second structures 125 may be arranged to be overlapped with each other.

The second structures 125 may be asymmetrically arranged with respect to the first structures 115. In this case, at least one of a material, a size, a shape, a pitch, or an arrangement pattern of the second structures 125 may be different from those of the first structures 115, respectively.

The substrate 105 may further include a material layer 150 to fill around (i.e., surround) the first and second structures 115 and 125. In this state, the first and second structures 115 and 125 may include a dielectric material having a refractive index higher than, and an absorption coefficient lower than, those of the material layer 150 formed around them. Furthermore, as described above, the first and second structures 115 and 125 may have a refractive index higher than that of the substrate 105.

The first and second structures 115 and 125 may include, for example, at least one of crystalline silicon, amorphous silicon, titanium oxide, silicon nitride, titanium nitride, transparent conductive oxide (ITO), a group III-V semiconductor compound, or metal oxide. However, the disclosure is not limited thereto. The material layer 150 filling around the first and second structures 115 and 125 may include, for example, silicon oxide, polymer-based material (SU-8, PMMA), or hydrogen silsesquioxane (HSQ), but the disclosure is not limited thereto.

As illustrated in FIG. 4, the first reflector 110 and the second reflector 120 form a Fabry-Perot resonator. The Fabry-Perot resonator includes a cavity in a space between the two separated reflectors 110 and 120 each having high reflectivity. Light input between the two reflectors 110 and 120 reciprocates between the reflectors 110 and 120 facing each other, causing constructive interference and destructive interference. In this state, light having a wavelength corresponding to the resonant wavelength $\lambda_c$ may satisfy a constructive interference condition, thereby being transmitted through the Fabry-Perot resonator. Light $\lambda_{an}$ having a different wavelength band may not be transmitted through the Fabry-Perot resonator. The Fabry-Perot resonator has excellent performance as a transmission spectrum has a narrower bandwidth with respect to the resonant wavelength $\lambda_c$ corresponding thereto. The performance of the Fabry-Perot resonator may be defined by a quality factor (Q factor) or a full width at half maximum (FWHM).

As the optical filter 100 according to the present example embodiment employs the first and second structures 115 and 125, each having a ring shape, which are a sub-wavelength structure having a high refractive index, as reflectors constituting the Fabry-Perot resonator, the optical filter 100 may exhibit a high reflectivity and may reduce the device volume. Furthermore, no polarization dependency may occur in the transmission of light of a specific wavelength due to the shape symmetry of the first and second structures 115 and 125.

The resonant wavelength $\lambda_c$ that is transmitted through the optical filter 100 (i.e., the transmission wavelength) is determined by design variables such as an optical material or a geometrical structure of the first reflector 110 and the second reflector 120. In detail, the resonant wavelength $\lambda_c$ that is transmitted through the optical filter 100 may be determined by at least one of an interval S (i.e., a distance) between the first and second reflectors 110 and 120, refractive indexes of the first and second structures 115 and 125, sizes of the first and second structures 115 and 125, and pitches P1 and P2 of the first and second structures 115 and 125. The sizes of the first and second structures 115 and 125 may include at least one of the inner radii $R1_{in}$ and $R2_{in}$, the outer radii $R1_{out}$ and $R2_{out}$, a ratio between the inner radius and the corresponding outer radius, and the heights t1 and t2. Furthermore, when the optical filter 100 further includes the material layer 150 that fills around the substrate 105 and the first and second structures 115 and 125, the resonant wavelength $\lambda_c$ that is transmitted through the optical filter 100 may be determined further by the refractive index of the substrate 105 and the refractive index of the material layer 150.

In the optical filter 100, the resonant wavelength $\lambda_c$ between the first and second reflectors 110 and 120 may be finely adjusted by changing design variables of the first and second reflectors 110 and 120, and further the resonant wavelength within each of the first and second structures 115 and 125, each having a ring shape, may be adjusted.

As such, the optical filter 100 according to the present example embodiment may transmit a desired wavelength band by using the design variables of the first and second reflectors 110 and 120. A degree of freedom with respect to wavelength selection is high, and the filtering characteristics with no polarization dependency and incident angle dependency may be obtained due to the shape symmetry of the first and second structures 115 and 125. Accordingly, the optical filter 100 may be employed as a narrow band pass filter or employed in a spectrometer having excellent spectral characteristics in a wide wavelength band. Furthermore, as the optical filter 100 may be monolithically integrated in a light detecting device such as an image sensor by using a semiconductor process, an ultra-compact portable spectrometer may be implemented.

Figure 5:
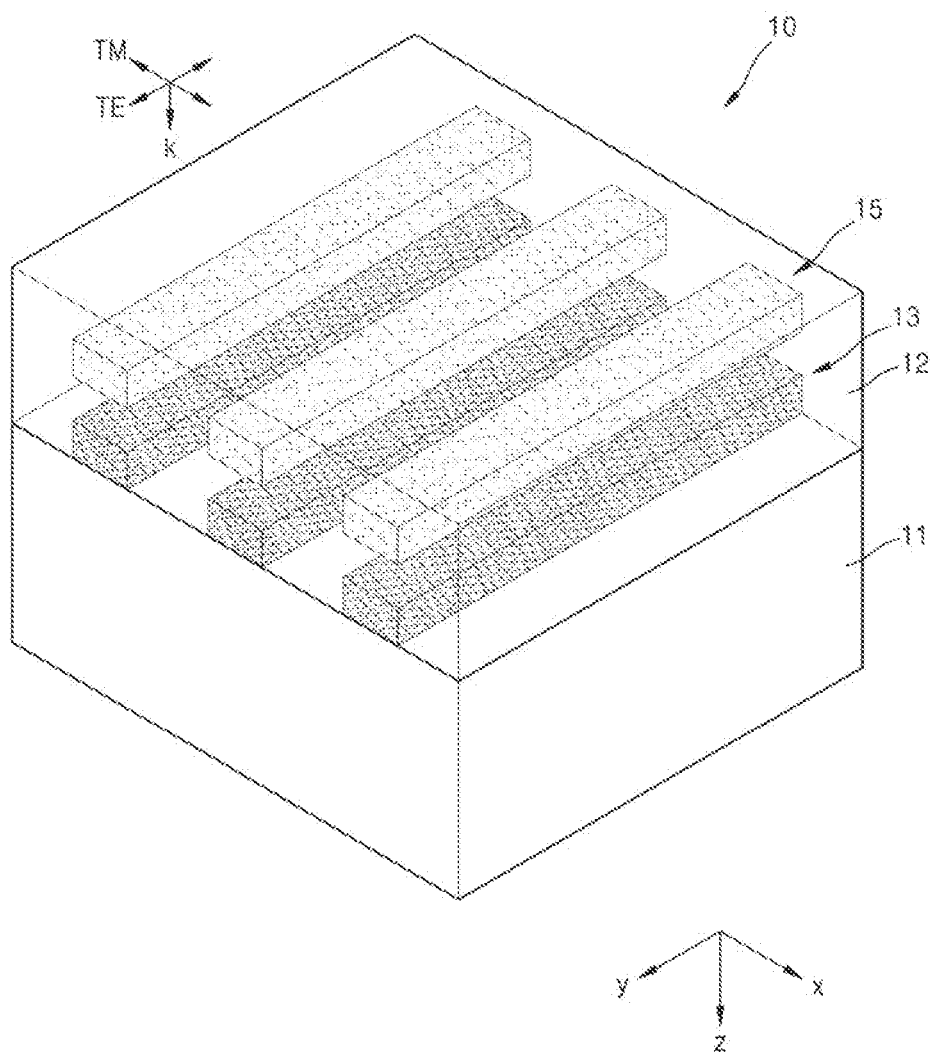
FIG. 5 illustrates that incident light is perpendicularly incident on an optical filter according to a comparative example.
Figure 6A:
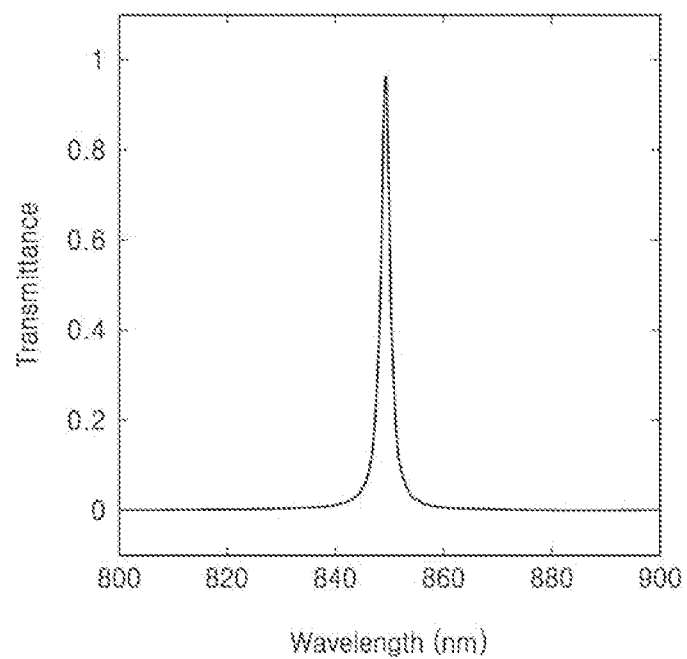
FIG. 6A is a graph of the spectral characteristics of the optical filter of FIG. 5 with respect to transverse electric (TE) polarized light.
Figure 6B:
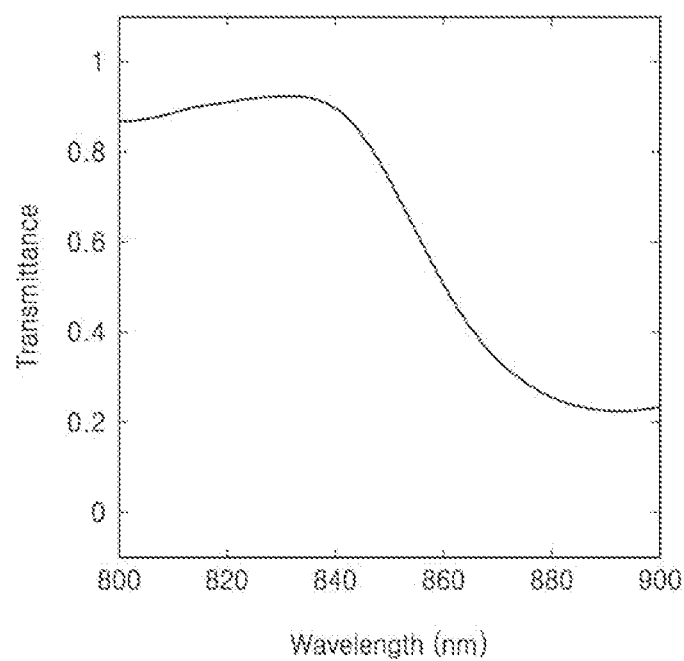
FIG. 6B is a graph of the spectral characteristics of the optical filter of FIG. 5 with respect to transverse magnetic (TM) polarized light.

FIG. 5 illustrates that the incident light is perpendicularly incident on an optical filter according to a comparative example. In FIG. 5, a k direction is an incident direction of the incident light and is parallel to the z-axis direction, and transverse electric (TE) polarized light of the incident light is parallel to a y-axis direction. FIG. 6A is a graph of the spectral characteristics of the optical filter of FIG. 5 with respect to the TE polarized light. FIG. 6B is a graph of the spectral characteristics of the optical filter of FIG. 5 with respect to transverse magnetic (TM) polarized light.

Referring to FIG. 5, the optical filter 10 according to a comparative example may include a substrate 11, a first reflector 13, and a second reflector 15, and each of the first and second reflectors 13 and 15 may include a plurality of gratings each having a lengthwise direction in the y-axis direction. In the above structure, only the TE polarized portion of the light incident in the k direction exhibits resonant wavelength characteristics, that is, polarized light parallel to the y-axis direction in FIG. 5, but differently polarized light does not exhibit designed resonance characteristics.

In detail, as illustrated in FIG. 6A, the optical filter 10 according to a comparative example exhibits high transmittance at a certain center wavelength with respect to the TE polarized light and a spectrum having a good Q value, but exhibits, as illustrated in FIG. 6B, a different type of a spectrum with respect to the TM polarized light. As shown, the optical filter 10 does not perform a spectroscopic function with respect to the light of a designed wavelength. Certain polarized light is formed by a combination of TE and TM polarized light, that is, non-polarized light is in the form in which the TE and TM polarized light are evenly distributed, and thus the optical filter 10 has a light loss of 50% in the spectroscopy of the incident light. However, the optical filter 100 according to an example embodiment may have no light loss according to polarization as described below.

Figure 7:
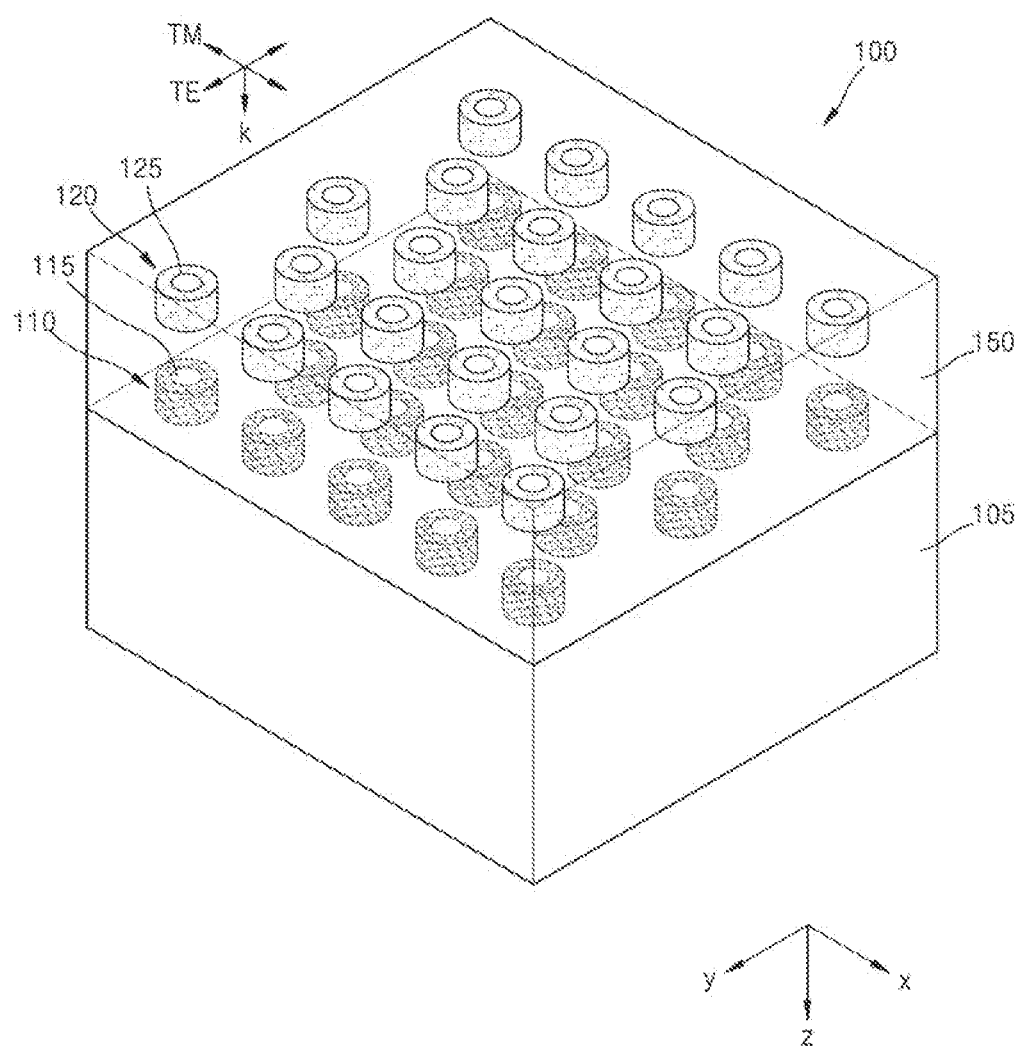
FIG. 7 illustrates that incident light is perpendicularly incident on the optical filter of FIG. 1.

FIG. 7 illustrates an example in which the incident light is perpendicularly incident on the optical filter 100 of FIG. 1. The materials, shapes, sizes, and pitches of the first and second structures 115 and 125 are the same as those of FIG. 1. In this state, the pitches of the first and second structures 115 and 125 are set to be about 400 nm. Referring to FIG. 7, the k direction is the incident direction of the incident light and is parallel to the z-axis direction, and the TE polarized light of the incident light is parallel to the y-axis direction.

Figure 8A:
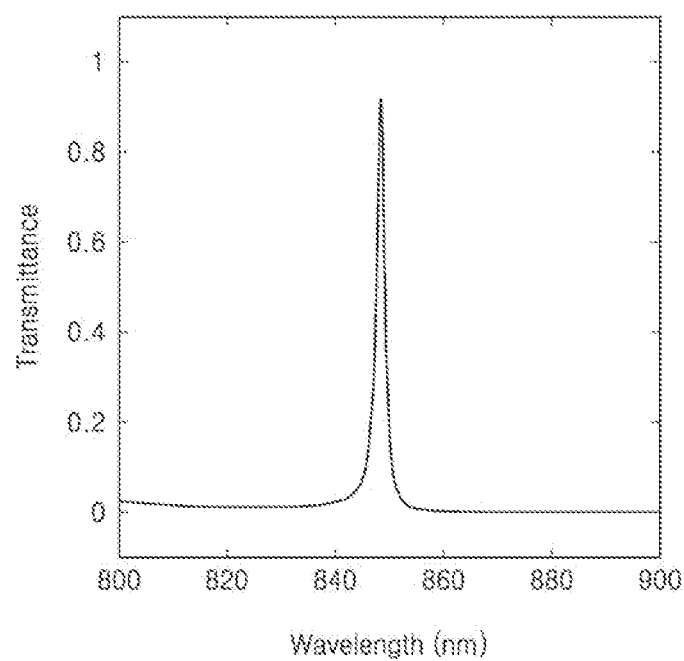
FIG. 8A is a graph of the spectral characteristics of the optical filter of FIG. 7 with respect to TE polarized light.
Figure 8B:
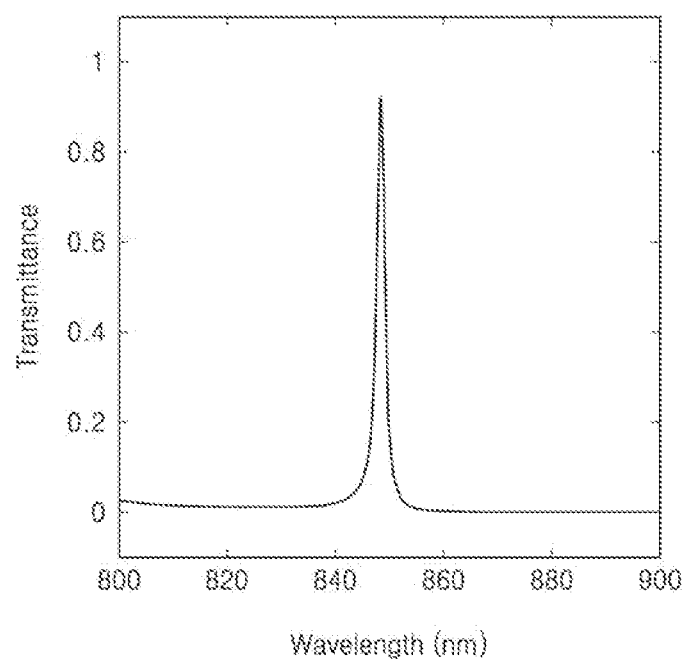
FIG. 8B is a graph of the spectral characteristics of the optical filter of FIG. 7 with respect to TM polarized light.

FIG. 8A is a graph of the spectral characteristics of the optical filter 100 of FIG. 7 with respect to TE polarized light. FIG. 8B is a graph of the spectral characteristics of the optical filter 100 of FIG. 7 with respect to the TM polarized light. As illustrated in FIGS. 8A and 8B, it may be seen that, in the optical filter 100 according to an example embodiment, spectral characteristics of the TE polarized light and the TM polarized light have almost no difference in the wavelength band and the waveform. In general, as certain polarized light is generated by a combination of the two orthogonal polarizations, even when light of a certain polarization component is incident on the optical filter 100 according to an example embodiment, the above transmission spectrum may be obtained.

Figure 9:
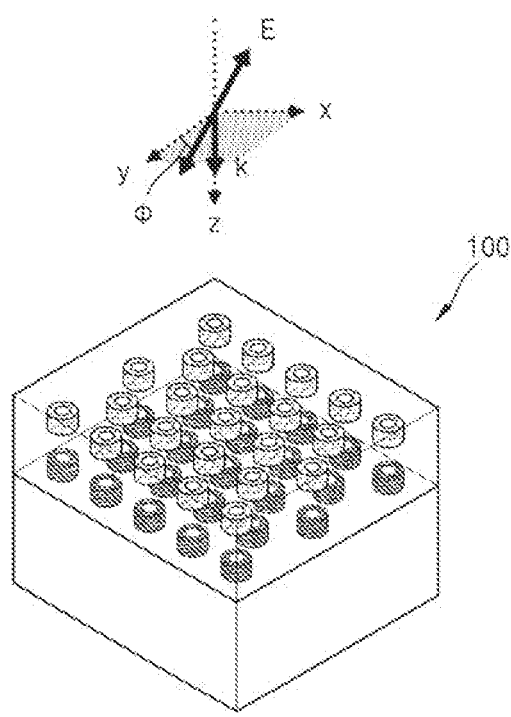
FIG. 9 illustrates that incident light is perpendicularly incident on the optical filter of FIG. 1.

FIG. 9 illustrates an example in which the incident light is perpendicularly incident on the optical filter 100 of FIG. 1. The materials, shapes, sizes, and pitches of the first and second structures 115 and 125 are the same as those of FIG. 1. In this state, the pitches of the first and second structures 115 and 125 are set to be about 400 nm. Referring to FIG. 9, the k direction that is the incident direction of the incident light is parallel to the z-axis direction, and the TE polarized light of the incident light forms a certain angle $\phi$ with respect to the y-axis direction.

Figure 10:
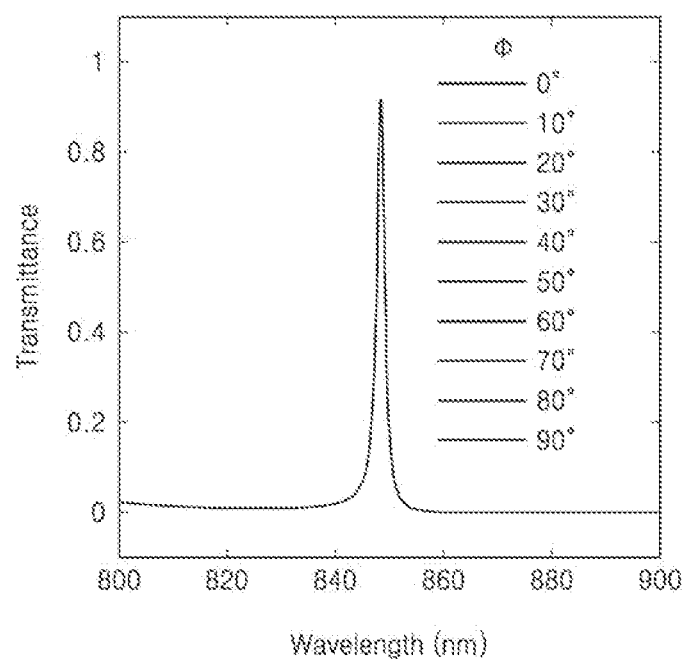
FIG. 10 is a graph of the spectral characteristics of the incident light according to a change in an angle ϕ of the TE polarized light with respect to a y-axis direction in FIG. 9.

FIG. 10 is a graph of the spectral characteristics of the incident light according to a change in the angle $\phi$ of the TE polarized light with respect to the y-axis direction as shown in FIG. 9. As illustrated in FIG. 10, even when the angle $\phi$ of the TE polarized light changes, there is almost no difference in the spectral characteristics, and thus it may be seen that the optical filter 100 according to an example embodiment has characteristics that function independently of TE polarization angle.

Figure 11:
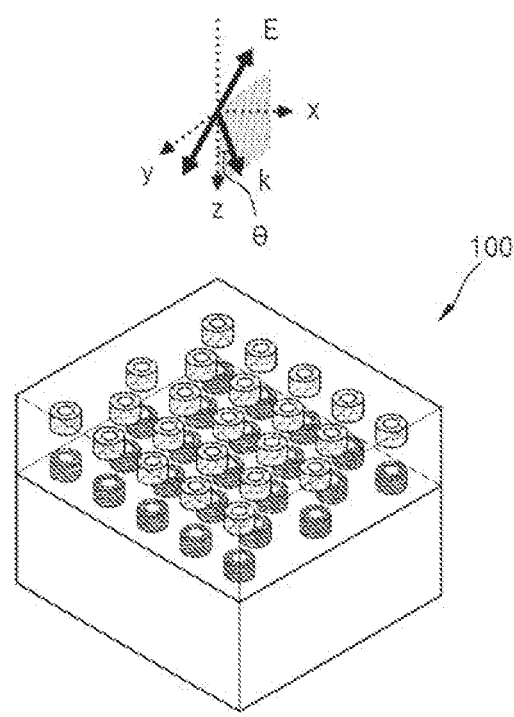
FIG. 11 illustrates that incident light is obliquely incident on the optical filter of FIG. 1.

FIG. 11 illustrates an example in which the incident light is obliquely incident on the optical filter 100 of FIG. 1. The materials, shapes, sizes, and pitches of the first and second structures 115 and 125 are the same as those of FIG. 1. In this state, the outer radius and the inner radius of each of the first and second structures 115 and 125 are set to be about 126 nm and about 26.25 nm, respectively. Referring to FIG. 11, the k direction is the incident direction of the incident light and forms a certain angle $\theta$ with respect to the z-axis direction, and the TE polarized light of the incident light forms a certain angle with respect to the y-axis direction.

Figure 12A:
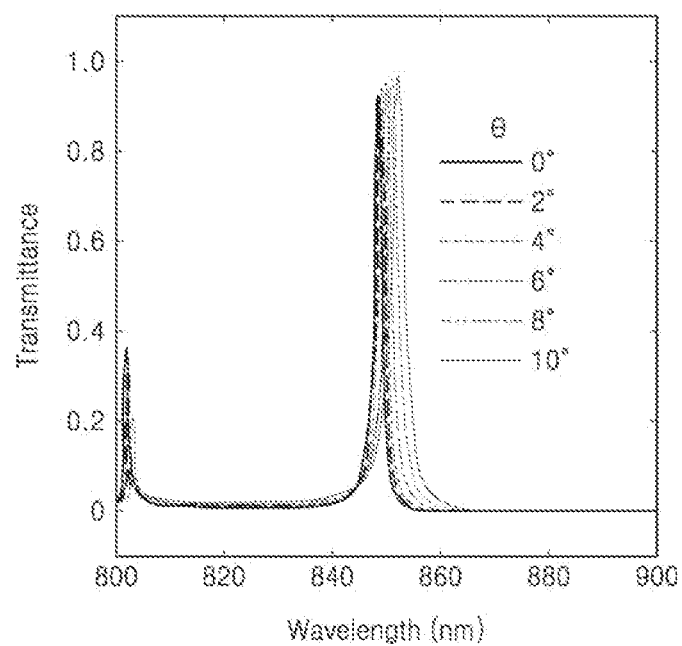
FIGS. 12A and 12B are graphs of the spectral characteristics of the incident light according to a change in an incident angle θ of the incident light with respect to a z-axis direction in FIG. 11.
Figure 12B:
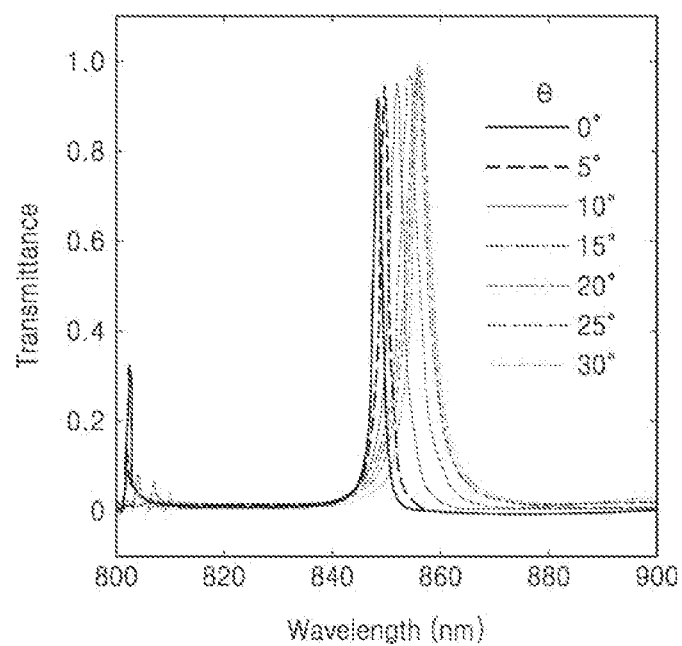

FIGS. 12A and 12B are graphs of the spectral characteristics of the incident light according to a change of the incident angle $\theta$ of the incident light with respect to the z-axis direction in FIG. 11. As illustrated in FIGS. 12A and 12B, in the optical filter 100 according to an example embodiment, it may be seen that there is almost no difference in the spectral characteristics even when the incident angle $\theta$ of the incident light varies from about 0° to about 30°.

Figure 13:
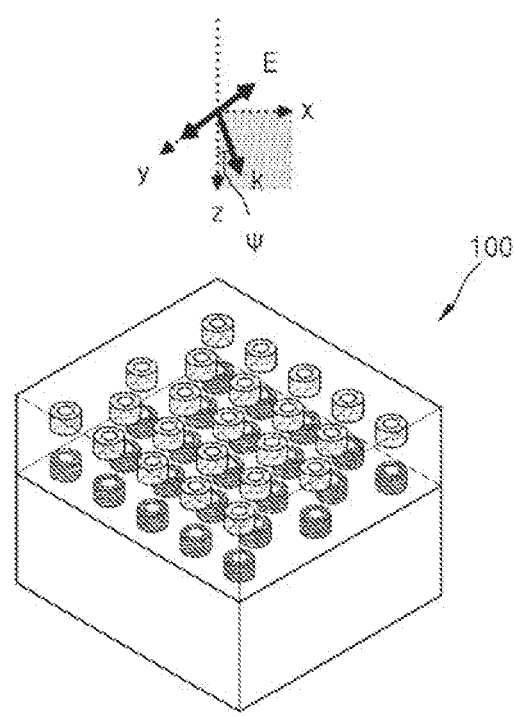
FIG. 13 illustrates that incident light is obliquely incident on the optical filter of FIG. 1.

FIG. 13 illustrates an example in which the incident light is obliquely incident on the optical filter 100 of FIG. 1. The materials, shapes, sizes, and pitches of the first and second structures 115 and 125 are the same as those of FIG. 1. In this state, the outer radius and the inner radius of each of the first and second structures 115 and 125 are set to be about 126 nm and about 26.25 nm, respectively. Referring to FIG. 13, the k direction is the incident direction of the incident light and forms a certain angle $\psi$ with respect to the z-axis direction, and the TE polarized light of the incident light is parallel to the y-axis direction.

Figure 14A:
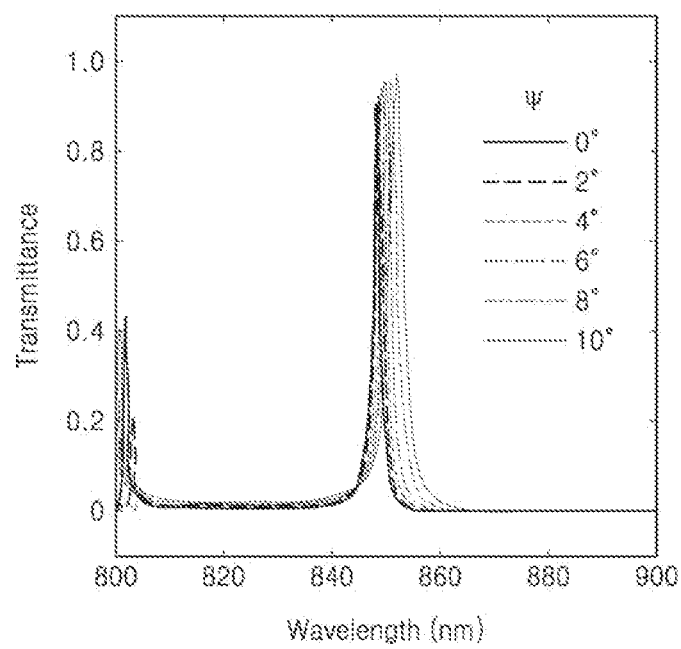
FIGS. 14A and 14B are graphs of the spectral characteristics of the incident light according to a change in an incident angle ψ of the incident light with respect to a z-axis direction in FIG. 13.
Figure 14B:
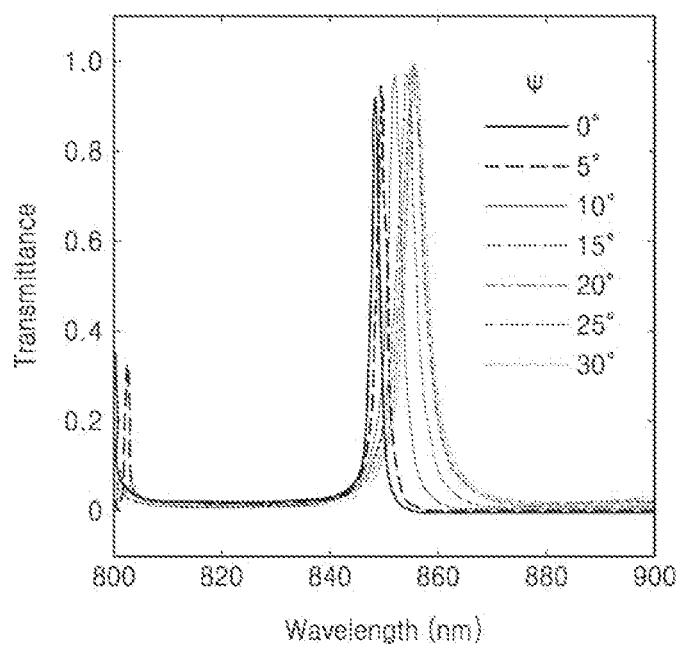

FIGS. 14A and 14B are graphs of the spectral characteristics of the incident light according to a change in an incident angle $\psi$ of the incident light with respect to the z-axis direction in FIG. 13. As illustrated in FIGS. 14A and 14B, in the optical filter 100 according to an example embodiment, it may be seen that there is almost no difference in the spectral characteristics even when the incident angle $\psi$ of the incident light varies from about 0° to about 30°.

As illustrated in FIGS. 11 to 14B, in the optical filter 100 according to an example embodiment, it may be seen that the spectral characteristics of the incident light do not change much even when the incident angle of the incident light varies. As described above, the optical filter 100 according to an example embodiment may have excellent spectral characteristics without polarization dependency and incident angle dependency.

Figure 15A:
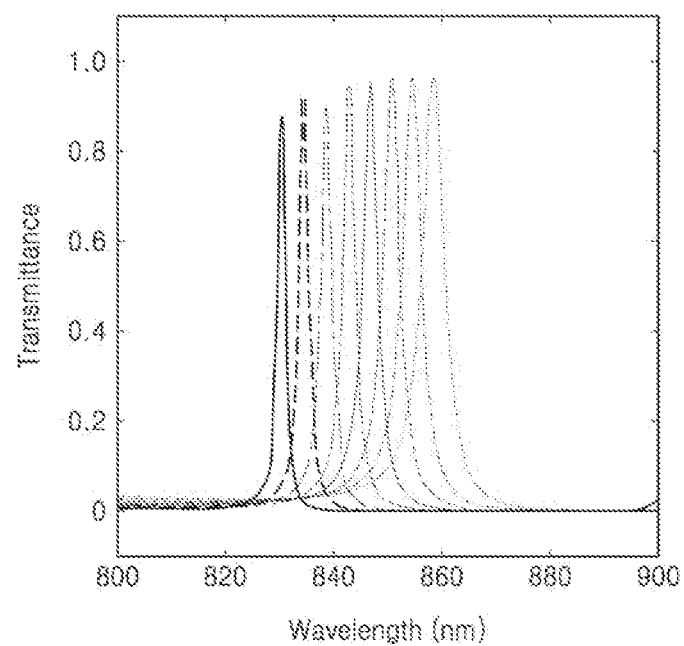
FIGS. 15A, 15B, 15C are graphs of the spectral characteristics according to a ratio of an outer radius to an inner radius of first and second structures, in the optical filter of FIG. 1.
Figure 15B:
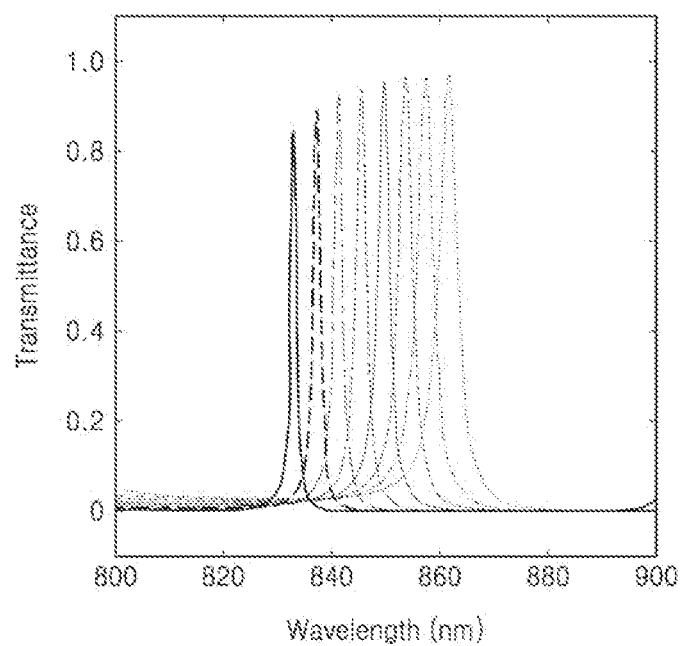
Figure 15C:
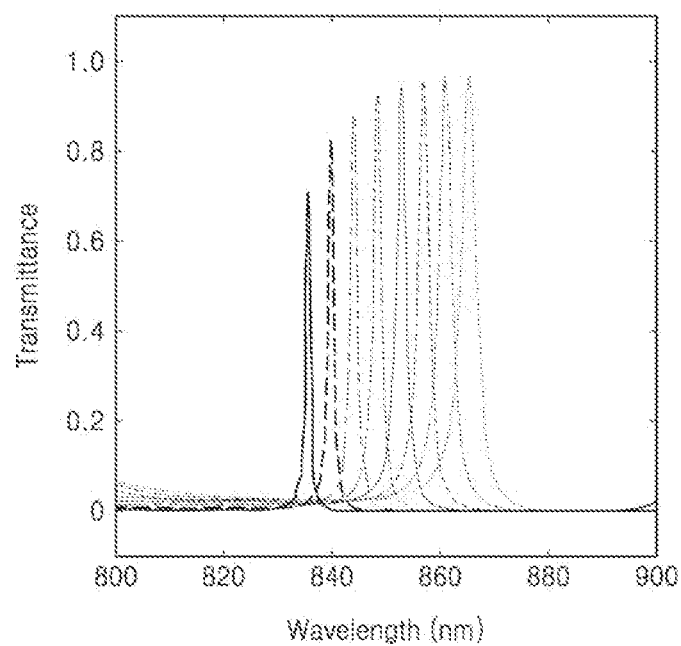

FIGS. 15A to 15C are graphs of the spectral characteristics according to a ratio of the outer radius to the inner radius of the first and second structures 115 and 125, in the optical filter 100 of FIG. 1. FIGS. 15A to 15C illustrate a case in which the incident light is perpendicularly incident on the optical filter 100 of FIG. 1. The materials, shapes, sizes, and pitches of the first and second structures 115 and 125 are the same as those of FIG. 1. The pitches of the first and second structures 115 and 125 are set to be about 400 nm, the heights of the first and second structures 115 and 125 are set to be about 370 nm, and the interval between the first and second reflectors 110 and 120 is set to be about 350 nm. FIGS. 15A to 15C respectively illustrate the spectral characteristics of the incident light when the outer radius of the first and second structures 115 and 125 varies from about 120 nm to about 130 nm.

FIG. 15A illustrates the spectral characteristics when a ratio $R_{out}/R_{in}$ of the outer radius to the inner radius of the first and second structures 115 and 125 is about 4.0. FIG. 15B illustrates the spectral characteristics when a ratio $R_{out}/R_{in}$ of the outer radius to the inner radius of the first and second structures 115 and 125 is about 4.3. FIG. 15C illustrates the spectral characteristics when a ratio $R_{out}/R_{in}$ of the outer radius to the inner radius of the first and second structures 115 and 125 is about 4.8.

Referring to FIGS. 15A to 15C, in the optical filter 100 according to an example embodiment, it may be seen that various spectral characteristics may be obtained by changing the ratio $R_{out}/R_{in}$ of the outer radius to the inner radius of the first and second structures 115 and 125, and sharp and uniform spectral characteristics having a FWHM of about 2 nm to about 6 nm may be obtained.

In the optical filter 100 of FIGS. 15A to 15C according to an example embodiment, various spectral characteristics may be obtained by changing the ratio of the outer radius to the inner radius among the design variables of the first reflector 110 and the second reflector 120. However, the disclosure is not limited thereto, and various spectral characteristics may be obtained by changing at least one of the other design variables of the first reflector 110 and the second reflector 120.

Figure 16:
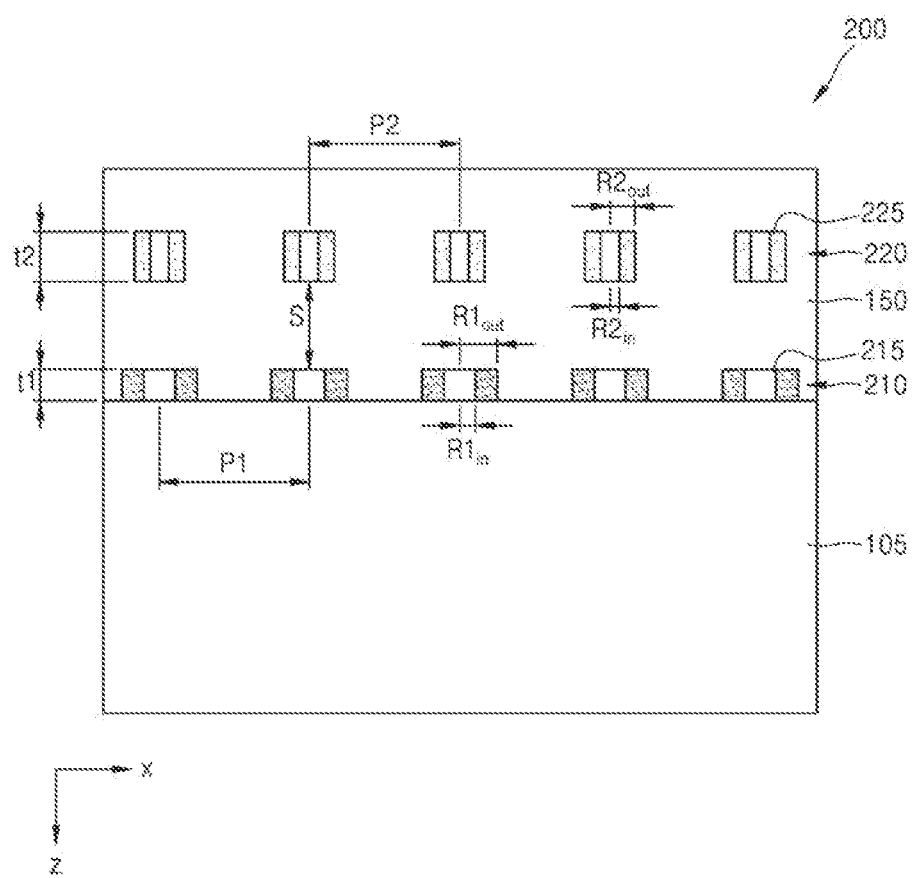
FIG. 16 is a cross-sectional view of an optical filter according to an example embodiment.
Figure 17:
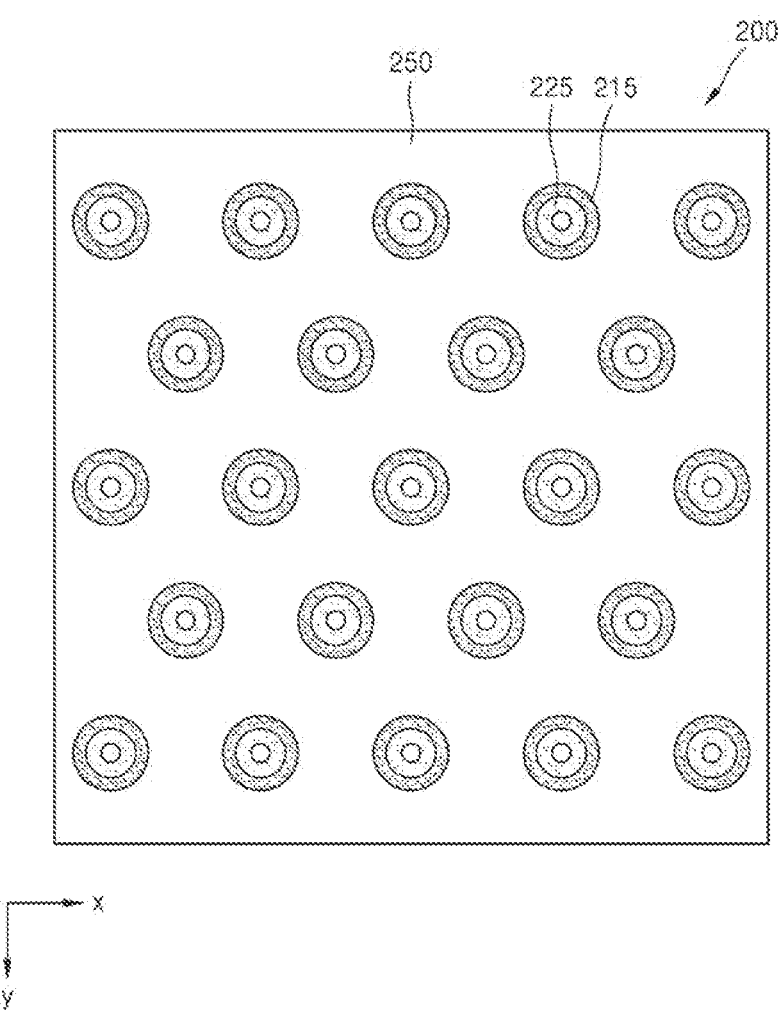
FIG. 17 is a plan view of the optical filter of FIG. 16.

FIG. 16 is a cross-sectional view of an optical filter 200 according to an example embodiment. FIG. 17 is a plan view of the optical filter 200 of FIG. 16.

Referring to FIG. 16, the optical filter 200 may include first and second reflectors 210 and 220 arranged spaced apart from each other at the certain interval S. The first reflector 210 may include a plurality of first structures 215, each having a ring shape, and the second reflector 220 may include a plurality of second structures 225, each having a ring shape.

In the optical filter 200 according to the present example embodiment, the first and second structures 215 and 225 are asymmetrically arranged with each other. In this state, the first and second structures 215 and 225 may be different from each other in terms of at least one of a material, a shape, a size, a cycle, or an arrangement pattern.

For example, the first structures 215 are arranged in two dimensions with the first pitch P1 in a direction, and each of the first structures 215 may have the outer radius $R1_{out}$, the inner radius $R1_{in}$, and the height t1. The second structures 225 are arranged in two dimensions with the second pitch P2 in a direction, and each of the second structures 225 may have an outer radius $R2_{out}$, an inner radius $R2_{in}$, and a height t2. FIG. 16 illustrates an example in which the outer radius $R1_{out}$ of the first structures 215 is greater than the outer radius $R2_{out}$ of the second structures 225 and the height t1 of the first structures 215 is less than the height t2 of the second structures 225.

As illustrated in FIG. 17, when viewed from a plan view that is perpendicular to the z-axis direction in which the first and second reflectors 210 and 220 are spaced apart from each other, the first structures 215 and the second structures 225 may be arranged to be overlapped with each other. However, the disclosure is not limited thereto. Furthermore, although each of the first structures 215 and the second structure 225 may be arranged, for example, in the form of a regular hexagon or an equilateral triangle, the disclosure is not limited thereto.

Figure 18A:
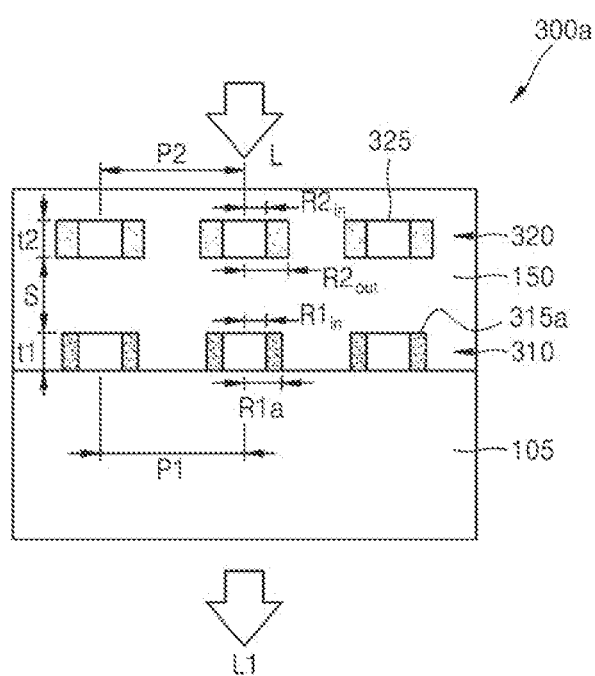
FIGS. 18A, 18B, and 18C illustrate examples of optical filters manufactured by changing an outer radius of the first structure, according to an example embodiment.
Figure 18B:
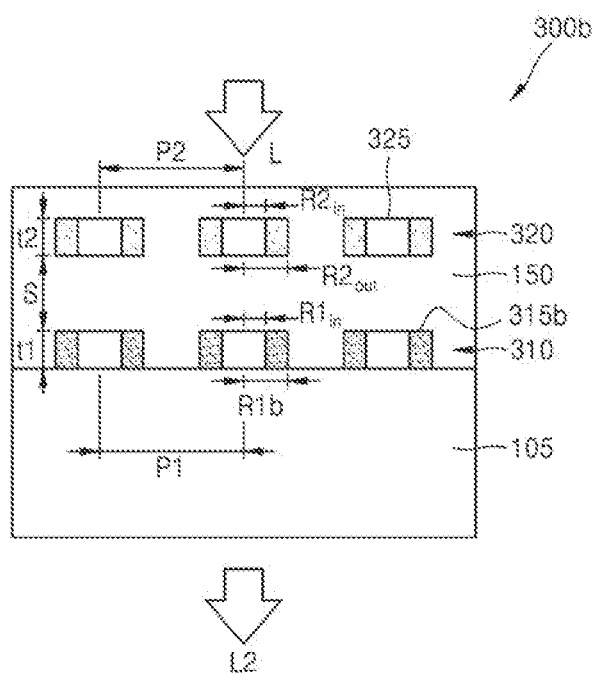
Figure 18C:
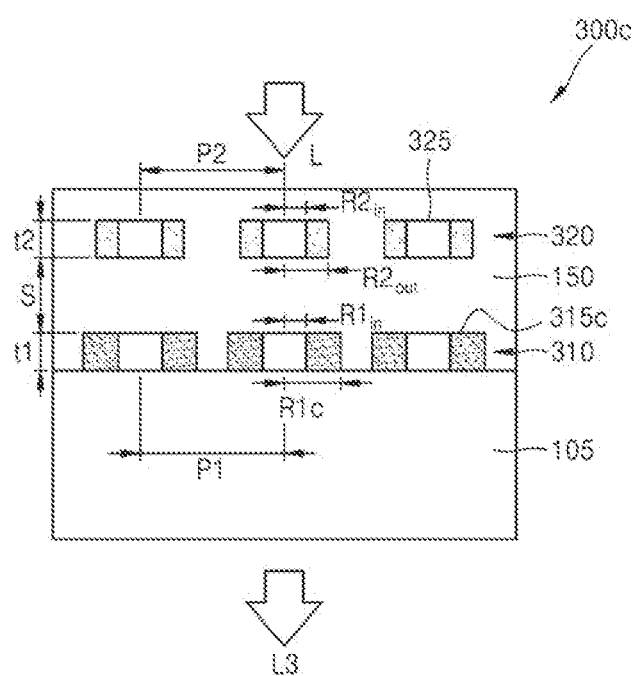

FIGS. 18A to 18C illustrate examples of different optical filters 300a, 300b, and 300c each manufactured with a different outer radius of a first structure, according to an example embodiment. In other words, the outer radius of the first structure 315a are changed to R1a, R1b, and R1c when other values remain fixed, including the inner radius $R1_{in}$ and the height t1 of a first structure 315a, the first pitch P1 of the first structures 315a, the outer radius $R2_{out}$, the inner radius $R2_{in}$, and the height t2 of a second structure 325, the second pitch P2 of the second structures 325, and the interval S between the first and second reflectors 310 and 320.

FIG. 18A illustrates an example in which, assuming that the outer radius of the first structure 315a is R1a, light L1 of a first wavelength of incident light L transmits through an optical filter 300a. FIG. 18B illustrates an example in which, assuming that the outer radius of the first structure 315b is R1b (>R1a), light L2 of a second wavelength of the incident light L transmits through an optical filter 300b. Furthermore, FIG. 18C illustrates an example in which, assuming that the outer radius of the first structure 315c is R1c (>R1b), light L3 of a third wavelength of the incident light L transmits through an optical filter 300c. As such, transmission wavelength may be selectively adjusted by changing only the outer radius of the first structure 315a, 315b, and 315c.

Figure 19A:
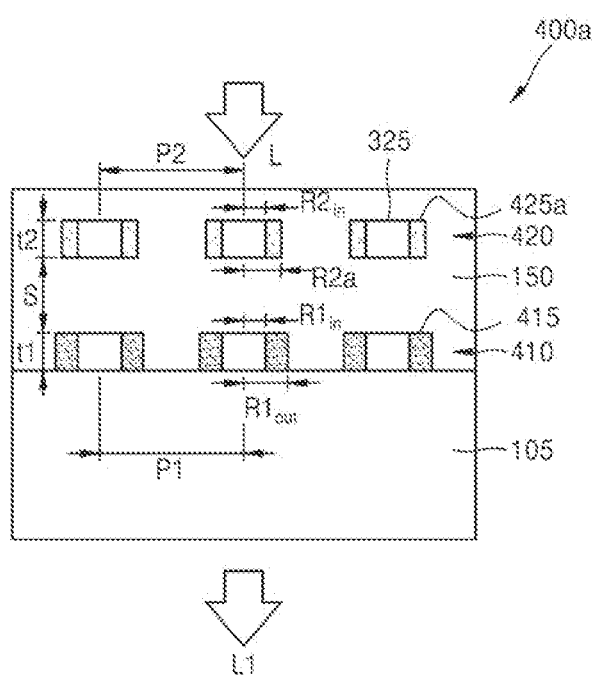
FIGS. 19A, 19B, and 19C illustrate examples of optical filters manufactured by changing an outer radius of the second structure, according to an example embodiment.
Figure 19B:
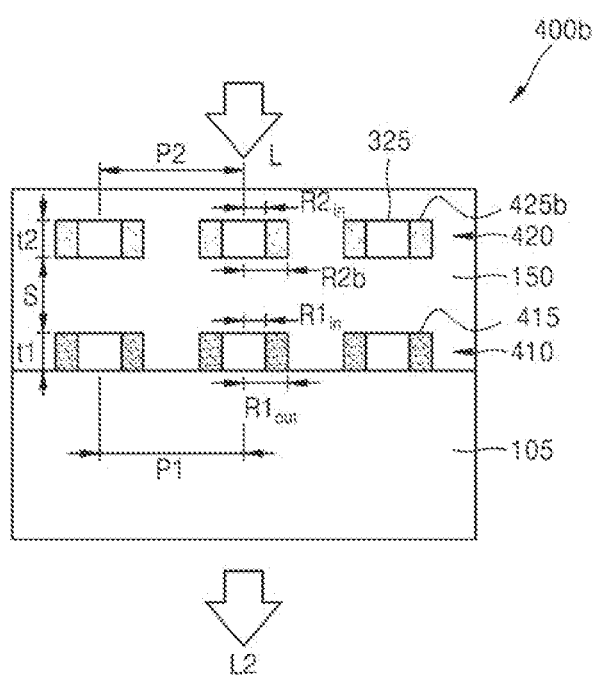
Figure 19C:
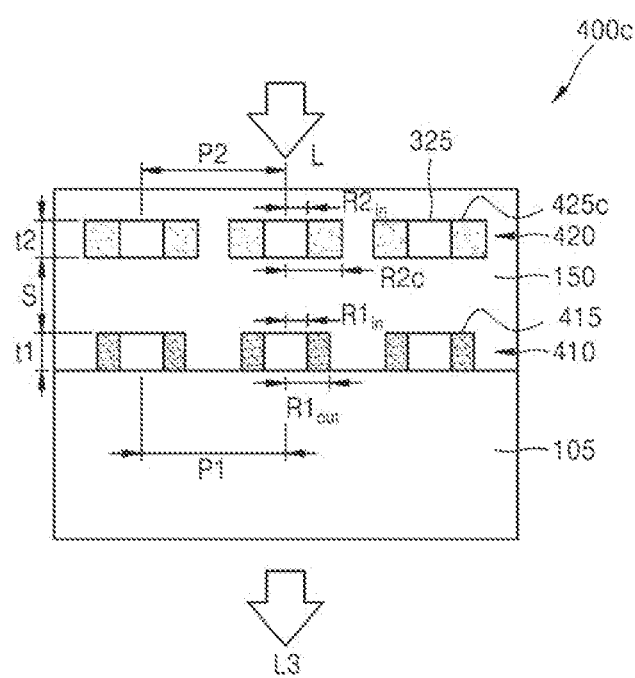

FIGS. 19A to 19C illustrate examples of different optical filters 400a, 400b, and 400c each manufactured with a different outer radius of the second structure, according to an example embodiment. In other words, the outer radius of a second structure 425a are changed to R2a, R2b, and R2c when other values remain fixed, including the outer radius $R1_{out}$, the inner radius $R1_{in}$, and the height t1 of a first structure 415, the first pitch P1 of the first structures 415, the inner radius $R2_{in}$ and the height t2 of the second structure 425a, the second pitch P2 of a second structures 425, and the interval S between first and second reflectors 410 and 420.

FIG. 19A illustrates an example in which, assuming that the outer radius of the second structure 425a is R2a, the light L1 of a first wavelength of the incident light L transmits through an optical filter 400a. FIG. 19B illustrates an example in which, assuming that the outer radius of the second structure 425b is R2b (>R2a), the light L2 of a second wavelength of the incident light L transmits through an optical filter 400b. Furthermore, FIG. 19C illustrates an example in which, assuming that the outer radius of the second structure 425c is R2c (>R2b), the light L3 of a third wavelength of the incident light L transmits through an optical filter 400c. As such, the transmission wavelength may be selectively adjusted by changing only the outer radius of the second structure 425a, 425b, and 425c.

In the above description, a case of selectively adjusting the transmission wavelength by changing the outer radius of the first or second structure is described as an example. However, the disclosure is not limited thereto, and the transmission wavelength may be selectively adjusted by changing the inner radius or the ratio of the outer radius to the inner radius of the first or second structure. In addition, the transmission wavelength may be selectively adjusted by changing other design variables of the first and second structures.

Figure 20:
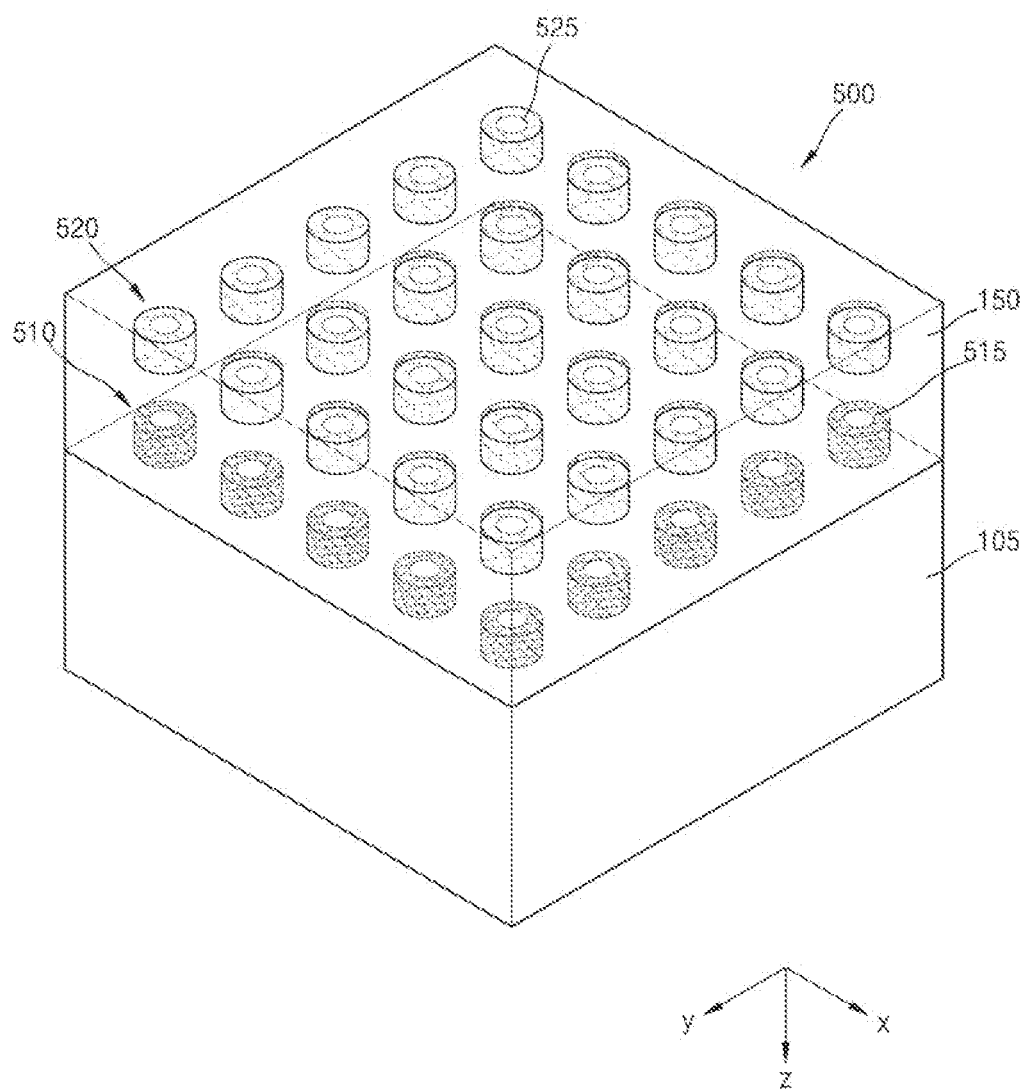
FIG. 20 is a perspective view of an optical filter according to an example embodiment.

FIG. 20 is a perspective view of an optical filter 500 according to an example embodiment. The optical filter 500 of FIG. 20 is the same as the optical filter 100 of FIG. 1, except for the arrangement pattern of first and second structures 515 and 525.

Referring to FIG. 20, the optical filter 500 may include first and second reflectors 510 and 520 arranged spaced apart from each other. In this state, the first reflector 510 may include a plurality of first structures 515, each having a ring shape, and the second reflector 520 may include a plurality of second structures 525, each having a ring shape. In this state, each of the first structures 515 and the second structures 525 may be arranged in a square pattern.

Figure 21:
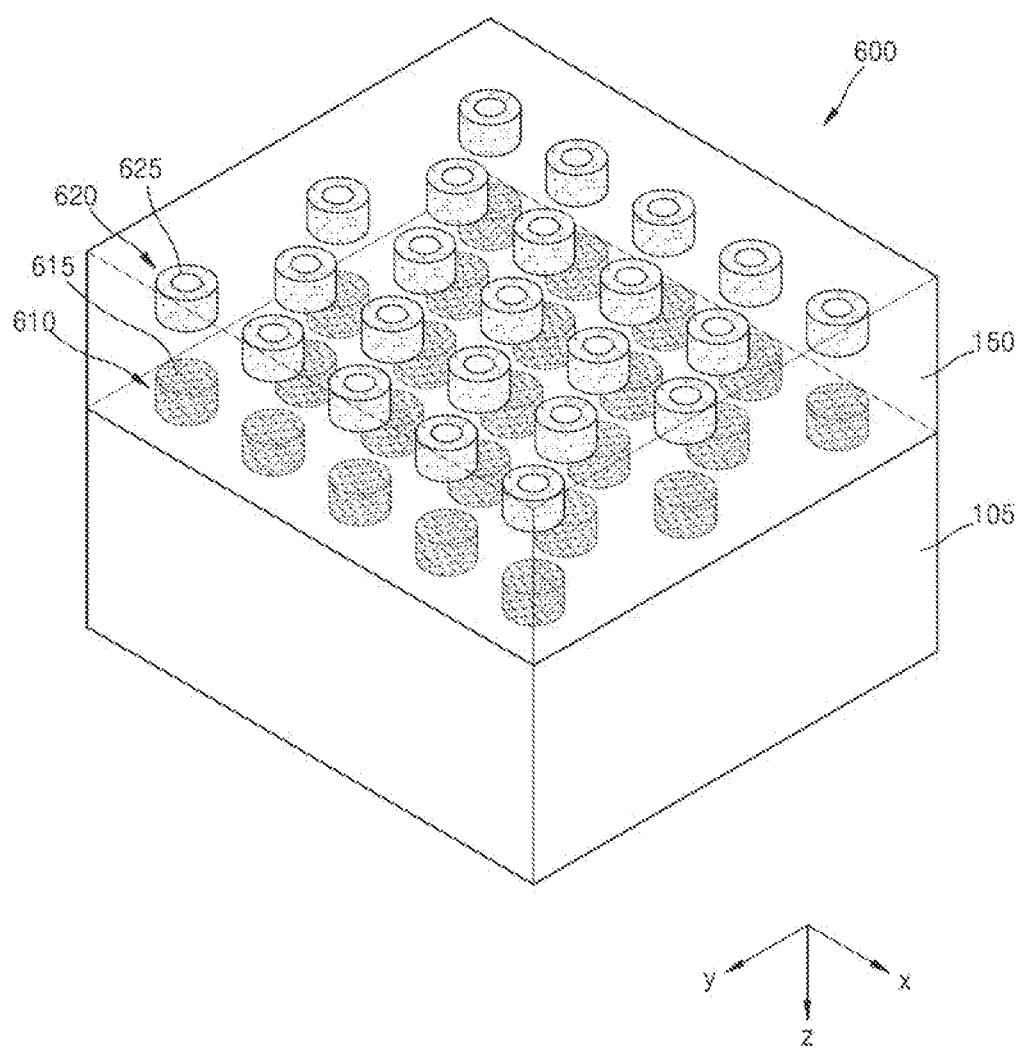
FIG. 21 is a perspective view of an optical filter according to an example embodiment.

FIG. 21 is a perspective view of an optical filter 600 according to an example embodiment. The optical filter 600 of FIG. 21 is the same as the optical filter 100 of FIG. 1, except that a first structure 615 has a disc shape, not a ring shape.

Referring to FIG. 21, the optical filter 600 may include first and second reflectors 610 and 620 arranged spaced apart from each other. In this state, the first reflector 610 may include a plurality of first structures 615 cyclically arranged in two dimensions, and the second reflector 620 may include a plurality of second structures 625 cyclically arranged in two dimensions. In this state, the first and second structures 615 and 625 may be sub-wavelength structures. Each of the first structures 615 and the second structures 625 may be arranged, for example, in the form of an equilateral triangle, a square, or a regular hexagon.

The first structures 615 each may have a disc shape. The first structures 615 each may have a radius and a height, and the first structures 615 may be cyclically arranged with a first pitch in a direction. The second structures 625 each may have a ring shape. The second structures 625 each may have an outer radius, an inner radius, and a height, and the second structures 625 may be cyclically arranged with a second pitch in a direction.

The substrate 105 may be provided and a material layer 150 may be provided to fill around the first and second structures 615 and 625. The first and second structures 615 and 625 may include a dielectric material having a higher refractive index and a lower absorption coefficient than corresponding values of the material layer 150.

The first reflector 610 including the first structures 615, each having a disc shape, and the second reflector 620 including the second structures 625, each having a ring shape, may constitute the Fabry-Perot resonator. A resonant wavelength of light that is transmitted through the optical filter 600 may be determined by at least one of the design variables such as an optical material or a geometrical structure of the first reflector 610 and the second reflector 620.

Although FIG. 21 illustrates an example in which the first structures 615 each has a disc shape of a cylindrical form, the disclosure is not limited thereto, and the first structures 615 each may have a disc shape of a rectangular column or other polygonal column. Furthermore, although, in the above description, each of the first structures 615 has a disc shape and each of the second structures 625 has a ring shape, the first structures 615 may have a ring shape and the second structures 625 may have a disc shape.

Figure 22:
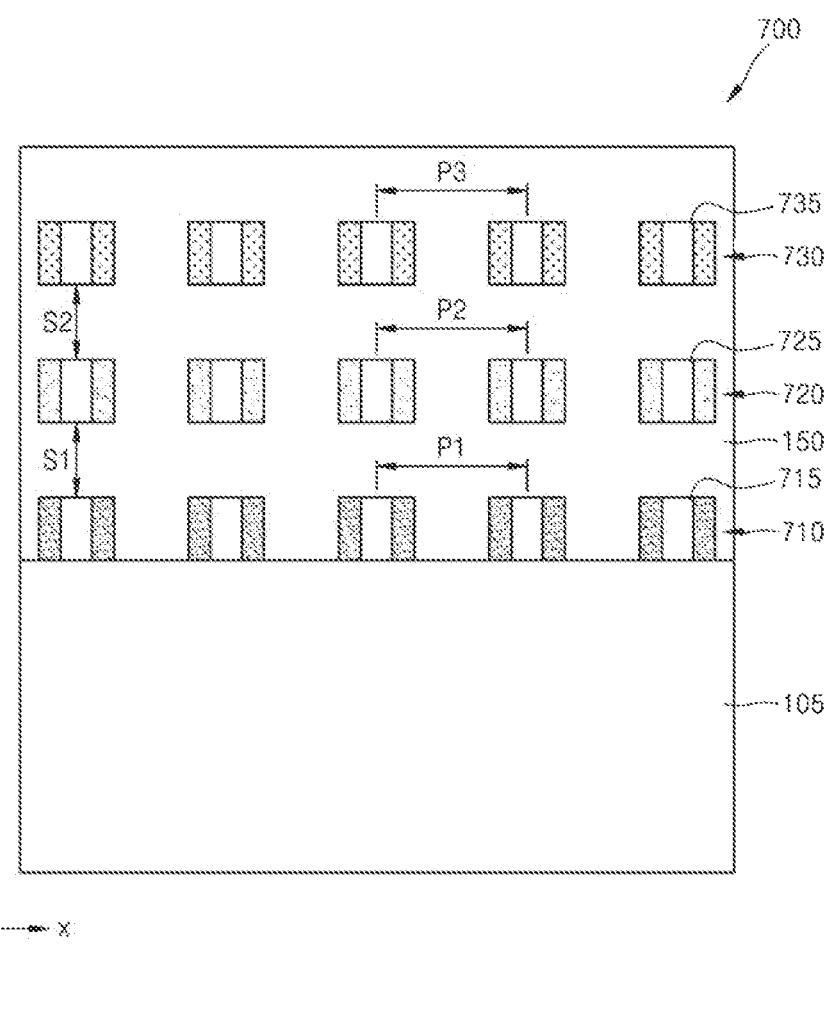
FIG. 22 is a cross-sectional view of an optical filter according to an example embodiment.

FIG. 22 is a cross-sectional view of an optical filter 700 according to an example embodiment. The optical filter 700 of FIG. 22 is the same as the optical filter 100 of FIG. 1, except that three reflectors are provided.

Referring to FIG. 22, the optical filter 700 may include first, second, and third reflectors 710, 720, and 730 arranged spaced apart from each other. In this state, the first and second reflectors 710 and 720 may be arranged spaced apart from each other with a first interval S1, and the second and third reflectors 720 and 730 may be arranged spaced apart from each other with a second interval S2.

The first reflector 710 provided on the substrate 105 may include a plurality of first structures 715 cyclically arranged in two dimensions, the second reflector 720 may include a plurality of second structures 725 cyclically arranged in two dimensions, and the third reflector 730 may include a plurality of third structures 735 cyclically arranged in two dimensions. Each of the first, second, and third structures 715, 725, and 735 may have a ring shape as a sub-wavelength structure.

Each of the first, second, and third structures 715, 725, and 735 may have an outer radius, an inner radius, and a height. The first structures 715 may be cyclically arranged in a direction with the first pitch P1, the second structures 725 may be cyclically arranged in a direction with the second pitch P2, and the third structures 735 may be cyclically arranged in a direction with a third pitch P3. Each of the first, second, and third structures 715, 725, and 735 may be arranged, for example, in the form of an equilateral triangle, a square, or a regular hexagon, but the disclosure is not limited thereto.

The first, second, and third structures 715, 725, and 735 all may have the same material, size, shape, pitch, and arrangement pattern. Alternatively, the first, second, and third structures 715, 725, and 735 may be different from each other in terms of at least one of a material, a size, a shape, a pitch, or an arrangement pattern. The substrate 105 may be provided and the material layer 150 may be provided to fill around the first, second, and third structures 715, 725, and 735.

A resonant wavelength of light that is transmitted through the optical filter 700 may be determined by at least one of the design variables such as an optical material or a geometrical structure of the first, second, and third reflectors 710, 720, and 730.

In the above description, an example in which the first, second, and third structures 715, 725, and 735 all have a ring shape is described. However, the disclosure is not limited thereto, and at least one of the first, second, or third structures 715, 725, or 735 may have a ring shape, and the other structure(s) may have a disc shape. Furthermore, although in the above description, the optical filter 700 is described as having three reflectors 710, 720, and 730, the disclosure is not limited thereto, and the optical filter 700 may include four or more reflectors arranged spaced apart from each other.

Figure 23:
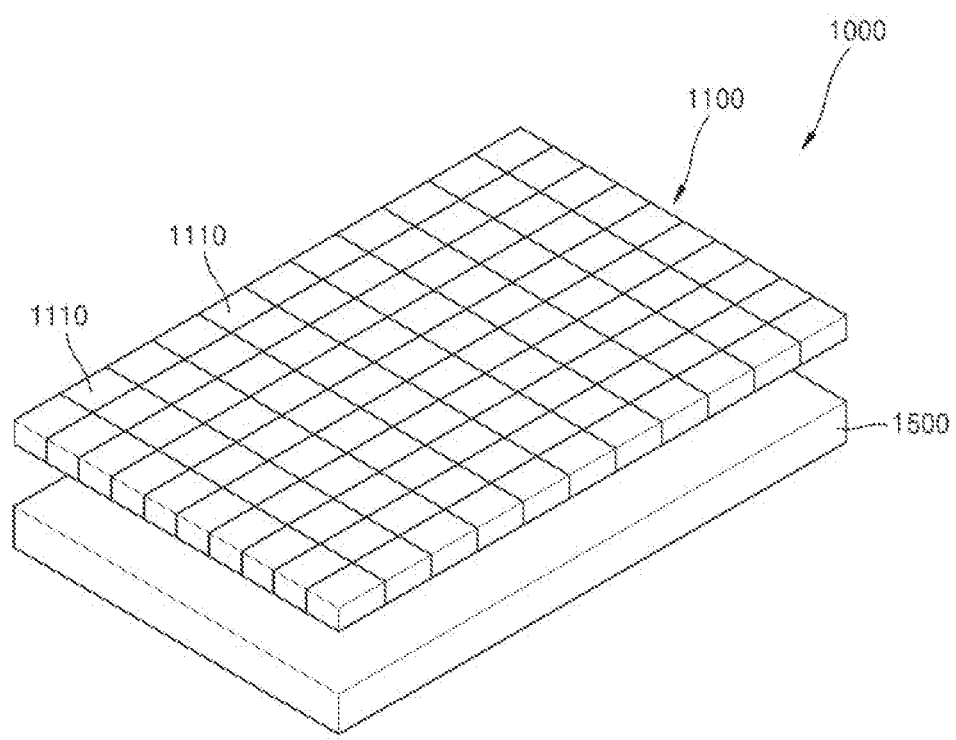
FIG. 23 is a perspective view of a spectrometer according to an example embodiment.

FIG. 23 is a perspective view of a spectrometer 1000 according to an example embodiment.

Referring to FIG. 23, the spectrometer 1000 may include a light detecting device 1500 and an optical filter 1100 provided above the light detecting device 1500. In this state, the optical filter 1100 may include a plurality of partial filters 1110 arranged in two dimensions above the light detecting device 1500. However, this is an example, and the partial filters 1110 may be arranged in one-dimension. The partial filters 1110 may be monolithically integrated on the light detecting device 1500 by using a semiconductor process.

Each of the partial filters 1110 may be any one or more of the optical filters described in the above-described example embodiments. Accordingly, a detailed description about the partial filters 1110 is omitted. In the above-described example embodiments, the wavelength of light transmitted through the optical filter may be selectively adjusted by changing at least one of the design variables of the structures constituting the optical filter. Accordingly, in the present example embodiment, by changing at least one of the design variables of the structure constituting each of the partial filters 1110, the partial filters 1110 may be provided to transmit light of different wavelength bands of the incident light.

The light detecting device 1500 may receive the light transmitted through the optical filter 1100 and convert the received light to electrical signals. In detail, the light incident on the optical filter 1100 is transmitted through the partial filters 1110, and the light of a different wavelength band that is transmitted through the partial filters 1110 arrives at pixels of the light detecting device 1500. The light detecting device 1500 converts the light incident on the pixels to electrical signals, thereby performing spectroscopy on the light incident on the optical filter 1100.

The light detecting device 1500 may include, for example, an image sensor or a photodiode such as a charge coupled device (CCD) or a complementary metal-oxide semiconductor (CMOS) image sensor. However, the disclosure is not limited thereto.

An additional optical filter for transmitting light of a different wavelength band may be further provided considering a wavelength band included in the light that is subject to spectroscopy, according to a specific use of the spectrometer 1000. Furthermore, other additional optical filters may be further provided to block light of a wavelength band that is not subject to spectroscopy.

The spectrometer 1000 may be used for various optical apparatuses or sensors. For example, the spectrometer 1000 may be used for gas sensors, chemical sensors, skin sensors, or food sensors. Such sensors may identify the types of and/or detect the concentrations of various molecules existing in the atmosphere by using the spectrometer 1000. The sensors may rely on the properties of the measured components, such that transmittance varies with respect to the wavelength according to the types and concentrations of components. Furthermore, the spectrometer 1000 may be used as a testing apparatus with respect to an object. For example, the spectrometer 1000 may be used as an apparatus for analyzing the location or shape of an object, or analyzing the components and physical properties of an object or freshness of foods according to the Raman spectroscopy.

Figure 24:
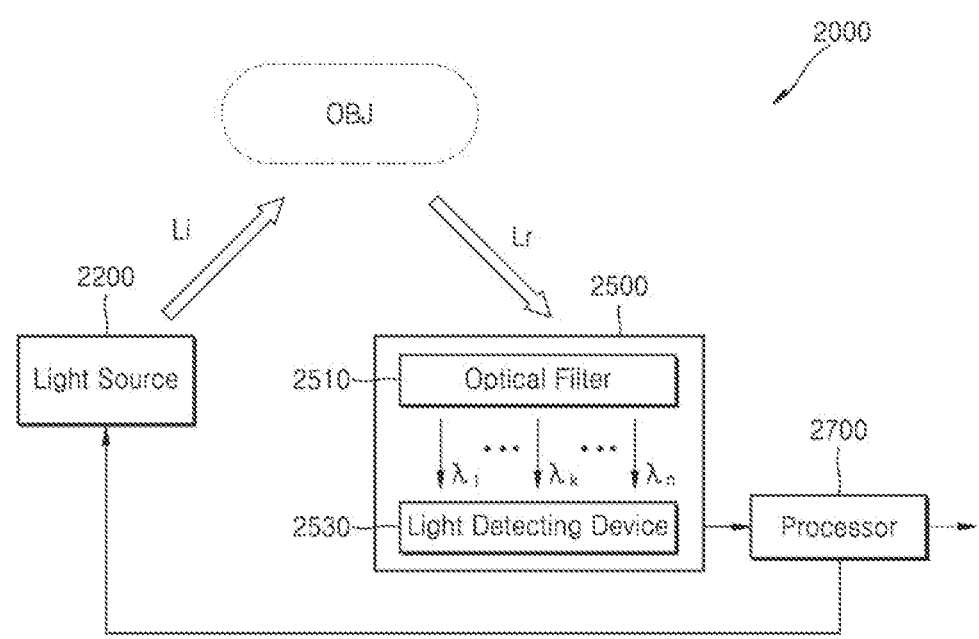
FIG. 24 is a schematic block diagram of an electronic apparatus according to an example embodiment.

FIG. 24 is a schematic block diagram of an electronic apparatus 2000 according to an example embodiment.

Referring to FIG. 24, the electronic apparatus 2000 may include a light source 2200 for radiating light Li toward an object OBJ, a spectrometer 2500 disposed on an optical path of light Lr reflected from the object OBJ, the light Li being radiated by the light source 2200, and a processor 2700 for analyzing at least one of physical properties, shape, location, or motion of the object OBJ by analyzing the light detected by the spectrometer 2500. In this state, the spectrometer 2500 may include a light detecting device 2530 and an optical filter 2510 provided on the light detecting device 2530, which may be the spectrometer of FIG. 23.

The operation of the electronic apparatus 2000 is described below with an example of the Raman spectroscopy.

The Raman spectroscopy uses a phenomenon that an energy state is shifted when light of a single wavelength scatters through the interaction with the molecular vibrations of a material forming the object OBJ.

Light Li radiated by the light source 2200 may act as exciting light to the object OBJ. The light source 2200 may provide light of a single wavelength that is suitable for detecting a wavelength shift. For example, a pulse-type laser light of a single wavelength may be provided. In other words, light is scattered by the molecular structure of the object OBJ. Light Lr reflected from the object OBJ may be scattered light having a wavelength converted by the molecular structure of the object OBJ, and the scattered light may include various spectrums having a different degree of wavelength conversion according to the molecular state of the object OBJ. This is referred to as a Raman signal.

When the Raman signal is input to the spectrometer 2500, each partial filter constituting the optical filter 2510 transmits light of a corresponding wavelength, the transmitted light is input to pixels of the light detecting device 2530, and the quantity of the light is detected.

The detected Raman signal is analyzed by the processor 2700. The Raman signal may include a wavelength shift of the incident light, which, as energy shift, may include information related to molecular vibration of a material, for example, information about a molecular structure or a bond form, or information about a functional group included in the object OBJ. Depending on the molecular composition forming the object OBJ, Raman peaks appear differently on the Raman spectrum, for example, glucose, urea, ceramide, keratin or collagen contained in the intercellular fluid or blood of the object OBJ may be analyzed. As such, the processor 2700 may analyze a material distribution amount in the object OBJ from the light from the object OBJ, that is, the Raman signal.

The electronic apparatus 2000 may be used as a three-dimensional optical sensor, that is, an apparatus for sensing the shape or motion of the object OBJ, an example of which is described below.

The light source 2200 may radiate the light Li including a plurality of wavelength bands toward the object OBJ. The light Li may be radiated to scan the object OBJ, and to this end, an optical element such as a beam steering component may be further disposed between the light source 2200 and the object OBJ.

The light Lr reflected from the object OBJ is received by the spectrometer 2500. In the spectrometer 2500, the optical filter 2510 may be configured to transmit light of a corresponding wavelength to detect the light of the wavelength bands radiated by the light source 2200.

The processor 2700 may analyze information about the object OBJ from the signal about the light of the wavelengths detected by the spectrometer 2500. For example, the determination of a three-dimensional shape of the object OBJ may be performed by performing an operation for measuring a time of flight from the detected light signal. In addition, the shape of the object OBJ may be determined through a direct time measurement method or an operation using correlation.

When the light source 2200 radiates light of different wavelengths and the spectrometer 2500 detects the light Lr reflected from the object OBJ for each wavelength, for example, a speed of scanning the object OBJ may be increased, and information about the location or shape of the object OBJ may be obtained at a relatively fast speed.

Although, in the above description, the physical properties of the object OBJ are analyzed by the Raman spectroscopy in which the electronic apparatus 2000 detects a change in the wavelength caused by the object OBJ, or the location or shape of the object OBJ is analyzed by analyzing the light Lr reflected from the object OBJ, the disclosure is not limited thereto.

Furthermore, the processor 2700 may control an overall operation of the electronic apparatus 2000. For example, the processor 2700 may control power supply control or pulse wave (PW) or continuous wave (CW) generation control with respect to the light source 2200. The electronic apparatus 2000 may include a memory for storing programs needed for an operation of the processor 2700 and other data.

A result of the operation in the processor 2700, that is, information about the shape, location, or physical properties of the object OBJ may be transmitted to another unit. For example, the information may be transmitted to autonomous driving equipment that needs information about the three-dimensional shape, motion, or location of the object OBJ, or to a medical apparatus using the physical properties of the object OBJ information, for example, biometric information. Alternatively, the unit to which the result is transmitted may include a display apparatus or a printer that outputs the result. In addition, the unit to which the result is transmitted may include smartphones, cell phones, personal digital assistants (PDAs), laptops, PCs, and other mobile or non-mobile computing devices, but the disclosure is not limited thereto.

According to the above-described example embodiments, as the optical filter includes a reflector having ring-shaped structures, a desired wavelength band may be selectively transmitted. Accordingly, an optical filter may be implemented, which has a high degree of freedom with respect to the wavelength selection and has no polarization dependency or incident angle dependency due to the shape symmetry of the structures. Accordingly, the optical filter according to the disclosure may be employed as a narrow band pass filter, or applied to spectrometers having excellent spectral characteristics in a wide wavelength band. Furthermore, as the optical filter may be monolithically integrated in the light detecting device such as an image sensor by using a semiconductor process, an ultra-compact portable spectrometer may be implemented.

Although the above optical filter, spectrometer, and optical apparatuses are described with reference to the example embodiments illustrated in the drawings, it will be understood by those of ordinary skill in the art that various changes in form and details may be made therein without departing from the spirit and scope of the disclosure as defined by the following claims.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. An optical filter comprising:
a first reflector comprising a plurality of first structures that are periodically two-dimensionally arranged, each first structure of the plurality of first structures having a ring shape; and
a second reflector spaced apart from the first reflector, the second reflector comprising a plurality of second structures that are periodically two-dimensionally arranged,
wherein a first size and a first pitch of the plurality of first structures are less than a wavelength of incident light that is incident on the optical filter, and
wherein a second size and a second pitch of the plurality of second structures are less than the wavelength of the incident light.

2. The optical filter of claim 1, wherein each second structure of the plurality of second structures has a ring shape or a disc shape.

3. The optical filter of claim 1, wherein a transmission wavelength of the incident light is determined based on at least one of respective refractive indexes of the plurality of first structures and the plurality of second structures, the first size of the plurality of first structures, the second size of the plurality of second structures, the first pitch of the plurality of first structures, the second pitch of the plurality of second structures, and an interval between the first reflector and the second reflector.

4. The optical filter of claim 3, wherein the first size of the plurality of first structures comprises at least one of a first inner radius, a first outer radius, a first ratio between the first inner radius and the first outer radius, and a first height, and
wherein the second size of the plurality of second structures comprises at least one of a second inner radius, a second outer radius, a second ratio between the second inner radius and the second outer radius, and a second height.

5. The optical filter of claim 4, wherein the transmission wavelength of the incident light is determined based on at least one of the first inner radius, the first outer radius, the first ratio between the first inner radius and the first outer radius, the second inner radius, the second outer radius, and the second ratio between the second inner radius and the second outer radius.

6. The optical filter of claim 1, wherein each second structure of the plurality of second structures entirely overlaps a corresponding first structure of the plurality of first structures in a direction perpendicular to a plane of the optical filter.

7. The optical filter of claim 1, further comprising a material layer surrounding the plurality of first structures and the plurality of second structures.

8. The optical filter of claim 7, wherein each of the plurality of first structures and the plurality of second structures comprises a dielectric material having a refractive index that is higher than a refractive index of the material layer and an absorption coefficient that is lower than an absorption coefficient of the material layer.

9. The optical filter of claim 8, wherein each of the plurality of first structures and the plurality of second structures comprises at least one of crystalline silicon, amorphous silicon, titanium oxide, silicon nitride, titanium nitride, transparent conductive oxide, a group III-V semiconductor compound, and metal oxide.

10. The optical filter of claim 1, further comprising a third reflector spaced apart from the second reflector, the third reflector comprising a plurality of third structures that are periodically two-dimensionally arranged.

11. The optical filter of claim 10, wherein each third structure of the plurality of third structures has a ring shape or a disc shape.

12. An optical filter comprising:
a plurality of partial filters having different center wavelengths,
wherein each partial filter of the plurality of partial filters comprises:
a first reflector comprising a plurality of first structures that are periodically two-dimensionally arranged, each first structure of the plurality of first structures having a ring shape; and
a second reflector spaced apart from the first reflector, the second reflector comprising a plurality of second structures that are periodically two-dimensionally arranged,
wherein a first size and a first pitch of the plurality of first structures are less than a wavelength of incident light that is incident on the optical filter, and
wherein a second size and a second pitch of the plurality of second structures are less than the wavelength of the incident light.

13. The optical filter of claim 12, wherein each second structure of the plurality of second structures has a ring shape or a disc shape.

14. The optical filter of claim 12, wherein a transmission wavelength of incident light is determined based on at least one of respective refractive indexes of the plurality of first structures and the plurality of second structures, the first size of the plurality of first structures, the second size of the plurality of second structures, the first pitch of the plurality of first structures, the second pitch of the plurality of second structures, and an interval between the first reflector and the second reflector.

15. The optical filter of claim 12, further comprising a material layer surrounding the plurality of first structures and the plurality of second structures.

16. A spectrometer comprising:
an optical filter comprising at least one partial filter; and
a light detecting device configured to receive light transmitted through the optical filter,
wherein each partial filter of the at least one partial filter comprises:
a first reflector comprising a plurality of first structures that are periodically two-dimensionally arranged, each first structure of the plurality of first structures having a ring shape;
a second reflector spaced apart from the first reflector, the second reflector comprising a plurality of second structures that are periodically two-dimensionally arranged,
wherein a first size and a first pitch of the plurality of first structures are less than a wavelength of incident light that is incident on the optical filter, and wherein a second size and a second pitch of the plurality of second structures are less than the wavelength of the incident light.

17. The spectrometer of claim 16, wherein each second structure from among the plurality of second structures has a ring shape or a disc shape.

18. The spectrometer of claim 16, wherein the light detecting device comprises an image sensor or a photodiode.

19. An electronic apparatus comprising:
a light source configured to emit light toward an object;
a spectrometer disposed on a light path of light reflected from the object that is irradiated by the light emitted by the light source; and
a processor configured to analyze at least one of physical properties, a shape, a location, and a motion of the object, by using light detected by the spectrometer,
wherein the spectrometer comprises:
an optical filter comprising at least one partial filter and a light detecting device configured to receive light transmitted through the optical filter;
a first reflector comprising a plurality of first structures that are periodically two-dimensionally arranged, each first structure of the plurality of first structures having a ring shape; and
a second reflector spaced apart from the first reflector, the second reflector comprising a plurality of second structures that are periodically two-dimensionally arranged,
wherein a first size and a first pitch of the plurality of first structures are less than a wavelength of incident light that is incident on the optical filter, and
wherein a second size and a second pitch of the plurality of second structures are less than the wavelength of the incident light.

20. An optical filter comprising:
a first layer of first nanostructures, the first nanostructures having a ring shape or a disc shape; and
a second layer of second nanostructures, the second nanostructures having the ring shape or the disc shape,
wherein a dimension of a plurality of dimensions of the first nanostructures and the second nanostructures is less than a wavelength of light incident upon the optical filter, and
wherein the plurality of dimensions comprises an inner radius of the first nanostructures and the second nanostructures, an outer radius of the first nanostructures and the second nanostructures, a ratio between the inner radius and the outer radius, a height of the first nanostructures and the second nanostructures, and a distance between the first layer and the second layer.

21. The optical filter of claim 20, wherein the first nanostructures have the ring shape.

22. The optical filter of claim 20, wherein a first dimension of the first nanostructures is different from a corresponding second dimension of the second nanostructures.

23. An optical filter comprising:
a first layer of first nanostructures, the first nanostructures having a ring shape or a disc shape; and
a second layer of second nanostructures, the second nanostructures having the ring shape or the disc shape,
wherein a dimension of a plurality of dimensions of the first nanostructures and the second nanostructures is less than a wavelength of light incident upon the optical filter,
wherein the first nanostructures are periodically arranged at a first interval in the first layer and the second nanostructures are periodically arranged at a second interval in the second layer, and
wherein the plurality of dimensions comprises an inner radius of the first nanostructures and the second nanostructures, an outer radius of the first nanostructures and the second nanostructures, a ratio between the inner radius and the outer radius, a height of the first nanostructures and the second nanostructures, a distance between the first layer and the second layer, the first interval, and the second interval.

* * * * *